US008200807B2

(12) United States Patent
Raghavan et al.

(10) Patent No.: US 8,200,807 B2
(45) Date of Patent: Jun. 12, 2012

(54) NON-BLOCKING LOCAL EVENTS IN A STATE-DIAGRAMMING ENVIRONMENT

(75) Inventors: Vijay Raghavan, Framingham, MA (US); Pieter J. Mosterman, Framingham, MA (US)

(73) Assignee: The MathWorks, Inc., Natick, MA (US)

( * ) Notice: Subject to any disclaimer, the term of this patent is extended or adjusted under 35 U.S.C. 154(b) by 637 days.

(21) Appl. No.: 11/513,572

(22) Filed: Aug. 31, 2006

(65) Prior Publication Data
US 2008/0059621 A1  Mar. 6, 2008

(51) Int. Cl.
*G06F 15/177* (2006.01)
*G06F 15/173* (2006.01)
*G06F 9/44* (2006.01)
*G06F 9/45* (2006.01)
*G06F 3/00* (2006.01)

(52) U.S. Cl. ........ 709/224; 709/220; 709/222; 709/223; 717/108; 717/116; 717/153; 717/165; 719/315; 719/316; 719/332

(58) Field of Classification Search .................. 709/220, 709/222, 223, 224; 703/16, 17; 700/83; 716/18; 717/108, 116, 153, 165; 719/315, 719/316, 332
See application file for complete search history.

(56) References Cited

U.S. PATENT DOCUMENTS

| | | | | |
|---|---|---|---|---|
| 5,608,649 A | * | 3/1997 | Gopinath et al. | 709/242 |
| 6,112,315 A | * | 8/2000 | Kuruvila et al. | 714/38.14 |
| 2003/0149809 A1 | * | 8/2003 | Jensen et al. | 710/22 |
| 2004/0014455 A1 | * | 1/2004 | Viel | 455/410 |
| 2004/0098240 A1 | * | 5/2004 | Thomason | 703/17 |
| 2004/0233232 A1 | * | 11/2004 | Iborra et al. | 345/700 |
| 2006/0155409 A1 | * | 7/2006 | Lan | 700/108 |
| 2006/0235548 A1 | * | 10/2006 | Gaudette | 700/83 |

OTHER PUBLICATIONS

Harel, David, "Statechart: A Visual Formalism for complex Systems," *Science of Computer Programming*, vol. 8:231-274 (1987).
Harel, David et al., "The Statemate Semantics of Statecharts," *ACM Transactions on Software Engineering and Methodology*, vol. 5(4):293-333 (1996).
Harel, David et al., "The Rhapsody Semantics of Statecharts (or, on the Executable Core of the UML)," retrieved online at http://citeseer.ist.psu.edu/cache/papers/cs/31589/http:zSzzSzwww.wisdom.weizmann.ac.ilzSz~dharelzSzpaperszSzRhapsodySemantics.pdf/hare101rhapsody.pdf (2005).
Invitation to Pay Additional Fees for Application No. PCT/US2007/019292, dated Feb. 19, 2008.
Crane, Michelle L. et al., "UML vs. Classical vs. Rhapsody Statecharts: Not All Models are Created Equal," *Model Drive Engineering Languages and Systems Lecture Notes in Computer Science*, vol. 3713:97-112 (2005).
International Search Report for Application No. PCT/US2007/019292, dated Jul. 3, 2008.

* cited by examiner

*Primary Examiner* — Ronodhi Serrao
*Assistant Examiner* — Farrukah Hussain
(74) *Attorney, Agent, or Firm* — Nelson Mullins Riley & Scarborough LLP

(57) ABSTRACT

This invention is directed to a method for use in a state diagramming environment on a computing device. The method includes obtaining a state diagram via the environment and processing a first event for the state diagram via the environment. The method also includes triggering a second event, wherein the triggering is based on the first event. The method further includes broadcasting the second event in a non-blocking fashion that allows the first event to continue being processed.

31 Claims, 18 Drawing Sheets

NON-BLOCKING LOCAL EVENTS IN A STATE-DIAGRAMMING ENVIRONMENT

FIELD OF THE INVENTION

The present invention relates to a representation of a state machine in a modeling environment. More specifically, the illustrative embodiment relates to a technique for handling local events within a state diagram.

BACKGROUND OF THE INVENTION

State diagramming environments provide graphical design and development tools for modeling and simulating event driven systems and subsystems. These environments may describe system behavior using state diagrams, which can include both logic and internal data and can be used to visually display a current state during the operation of the system being modeled. State diagramming environments may allow users to graphically represent hierarchical and parallel states of systems and event-driven transitions between states.

A state diagram, or statechart, contains "states" that may represent the mode of an object in an instant in time. A state in a state diagram can include a variable and an action. State diagrams and statecharts can be hierarchical and can contain parallel elements. States may exist within other states. A state within a state is sometimes referred to as a sub-state. A state that contains sub-states is said to be a parent state. The sub-states within the parent state are also known as its children, its child states or its decendants. States within a state diagram may be parallel states, also known as "AND" states. Multiple parallel states, usually denoted by a dotted outline, may be active simultaneously. Changes from one state to another are "transitions". These "transitions" are triggered by "events" and send the "event" from one state to another. "Actions" take place during the execution of a state diagram. An action can occur upon entering a state, while in a state, upon leaving a state, upon a transition, upon evaluating a condition, etc.

A broadcast may send an event to one or more states that are not connected by a transition. The broadcast may trigger transitions or actions in other portions of the state diagram. Broadcasting an event is useful as a means of synchronization among parallel states. A directed broadcast may send a specific event to a specific receiver state. A local broadcast may send an event to the parent state of the event that triggered it and the other descendents of the parent state. A local broadcast can be immediate and "blocking", i.e. the currently active event is suspended and the destination state may be evaluated with the new event as the active event. Only after the destination state evaluation is finished, does the processing return to the active event that sent the broadcast.

Unfortunately, the "blocking" associated with local broadcasts can have disadvantages. One such disadvantage can be that a blocking local broadcast between parallel states can lead to at least one state within that parallel configuration being processed twice. Additionally, the "blocking" associated with recursive event broadcasts may lead to cyclic behavior which can only be detected during simulation. The blocking behavior of local broadcasts also results in difficulties implementing the state diagram in hardware. In order to implement blocking in a computer-based state diagramming environment, the environment must have some storage (such as a stack) to keep track of the event that has been suspended while the state that received the broadcast finishes processing. A state diagram incorporating blocking broadcasts may not simply translate into hardware as it may require an infinitely large event stack. A state diagram with only non-blocking event processing may be more simply implemented in hardware as it does not require an event stack.

SUMMARY OF THE INVENTION

An illustrative embodiment of the present invention provides a method, a medium holding executable instructions, and a system for executing non-blocking local broadcasts within a state diagram in a state diagramming environment.

An illustrative embodiment is a method in an environment for state diagramming. The method includes obtaining a state diagram via the environment and processing a first event for the state diagram via the environment. The method further includes triggering a second event, wherein the triggering is based on the first event. The method also includes broadcasting the second event in a non-blocking fashion that allows the first event to continue being processed.

According to aspects of the illustrative embodiment, the method may include processing the second event asynchronously with the first event after the second event is broadcast. The method may also include initiating processing of the second event only after the processing of the first event has completed. The method may also include generating code from the state diagram. The code may generated in C, C++, Java or a hardware description language (HDL).

Another aspect of the illustrative embodiment is also a method in a computing device providing an environment for state diagramming. The method includes processing a state diagram in the environment, and determining whether to broadcast a local event, triggered by another event, in a non-blocking fashion that allows the another event to continue being processed. According to aspects of the illustrative embodiment the method may also include displaying a graphical representation that indicates whether the broadcasting is of a blocking or non-blocking type.

Yet another aspect of the illustrative embodiment is also a method in a computing device providing an environment for state diagramming. The method includes processing a state diagram in the environment and determining whether to broadcast a local event, triggered by another event, in a non-blocking fashion that allows the another event to continue being processed. The determining includes obtaining a delay time value for processing the local event. According to aspects of the illustrative embodiment the delay time value may be specified in any of real time units, a number of chart wakeups, a determined number of clock cycles, relative time units, and time units.

According to an additional aspect of the illustrative embodiment, any of the aforementioned methods can be realized by execution of stored instructions on a storage medium, such as magnetic or optical disks or other forms of memory.

Another aspect of the illustrative embodiment is a system for generating and displaying a state diagram including a processor. The processor can generate a state diagram environment, process a first event running in the environment and process a local broadcast of a second event triggered by the first event. The broadcast is performed so as to allow the first event to continue being processed during the broadcast.

Yet another aspect of the illustrative embodiment is a system for executing a state diagramming application including a processor. The processor can generate a state diagram environment, process a state diagram in the environment and determine whether to broadcast a local event, triggered by another event, in a non-blocking fashion that allows the another event to continue being processed. According to aspects of the illustrative embodiment the determining may include obtaining a delay time value for processing the local event, and initiating processing of the local event based on the delay time value.

Yet another aspect of the illustrative embodiment is a system for generating and displaying a state diagramming application. This system includes a computing device including memory for storing computer program instructions and data, and a processor for executing the stored computer program instructions. The computer program instructions include instructions for providing a state diagram in the environment for state diagramming. The computer program instructions further include instruction for broadcasting the second local event in a non-blocking fashion when the first event triggers the second event. The broadcasting takes place such that the first event continues to be processed.

Another aspect of the illustrative environment is a transmitting device to transmit computer readable data to a destination. The computer readable data includes instructions for processing a first event adapted to operate with a state diagram, and instructions related to a trigger associated with a first event. The instructions also include instructions for broadcasting a second event in a non-blocking fashion in response to the trigger. The non-blocking fashion allows the first event to process without substantial interruption during the broadcasting.

Yet another aspect of the illustrative environment is a device to transmit computer readable data. The data includes instructions to receive information associated with an environment for state diagramming and receive a state diagram that operates in the environment. The data further includes instructions to receive a user instruction that identifies whether a local event triggered by a first event should be broadcast in a non-blocking fashion, where the non-blocking fashion allows the first event to be processed without substantial interruption. According to aspects of the illustrative embodiment the data may further comprise instructions to obtain a delay time value for processing the local event and initiate processing of the local event based on the delay time value.

Another illustrative embodiment of the present invention is a method for processing a representation of a state machine. The method includes operating on a representation of a state machine comprising three elements and generating a static list for the three elements. The list represents a sequence in which the three elements are to be evaluated. The method also includes evaluating a first one of the three elements to generate an event that interacts with a third one of the three elements, wherein the event does not interact with a second one of the three elements. The method also includes evaluating the second one of the three elements prior to evaluating the third one of the three elements with respect to the event to generate a behavior related to one or more of the three elements.

An aspect of the illustrative embodiment is a method for processing a representation of a state machine. The method includes operating on a representation of a state machine and generating a static list of elements of the representation, the list representing a predetermined sequence in which certain elements are to be evaluated. The method further includes evaluating the elements of the representation in the order of the static list to generate a behavior related to one or more of the elements, wherein the evaluation of a particular element generates an event associated with another element that is not next in the predetermined sequence. According to aspects of the illustrative embodiment, the evaluating may include marking an event as active in a group of active events when the event is generated and querying the group of active events to determine if any of the active events result in a response or a reaction during the evaluation of an element.

According to aspects of the present invention the representation may be a diagram that interacts with a graphical modeling environment. The graphical modeling environment may be a state-diagramming environment and the diagram may be a state diagram. The graphical modeling environment may be a discrete event modeling environment and the diagram may be an entity flow diagram.

According to an additional aspect of the illustrative embodiment, any of the aforementioned methods can be realized by execution of stored instructions on a storage medium, such as magnetic or optical disks or other forms of memory.

An aspect of the illustrative embodiment is a system for generating and displaying a representation of a state machine that includes a processor. The processor can generate a representation of a state machine comprising three elements, operate on the representation of the state machine and generate a static list for the three elements, the list representing a sequence in which the three elements are to be evaluated. Additionally the processor can evaluate the second one of the three elements prior to evaluating the third one of the three elements with respect to the event to generate a behavior related to one or more of the three elements.

Another aspect of the illustrative invention is also a system for generating and displaying a graphical modeling environment which includes a processor. The processor can operate on a representation of a state machine and generate a static list of elements of the representation, the list presenting a predetermined sequence in which certain elements are to be evaluated. Additionally, the processor can evaluate the elements of the representation according to the predetermined sequence to generate a behavior related to one or more of the elements, wherein the evaluation of a particular element generates an event associated with another element that is not next to the particular element in the sequence.

BRIEF DESCRIPTION OF THE DRAWINGS

The aforementioned features and advantages, and other features and aspects of the present invention, will become better understood with regard to the following description and accompanying drawings, wherein.

DETAILED DESCRIPTION OF THE INVENTION

Figure 7:
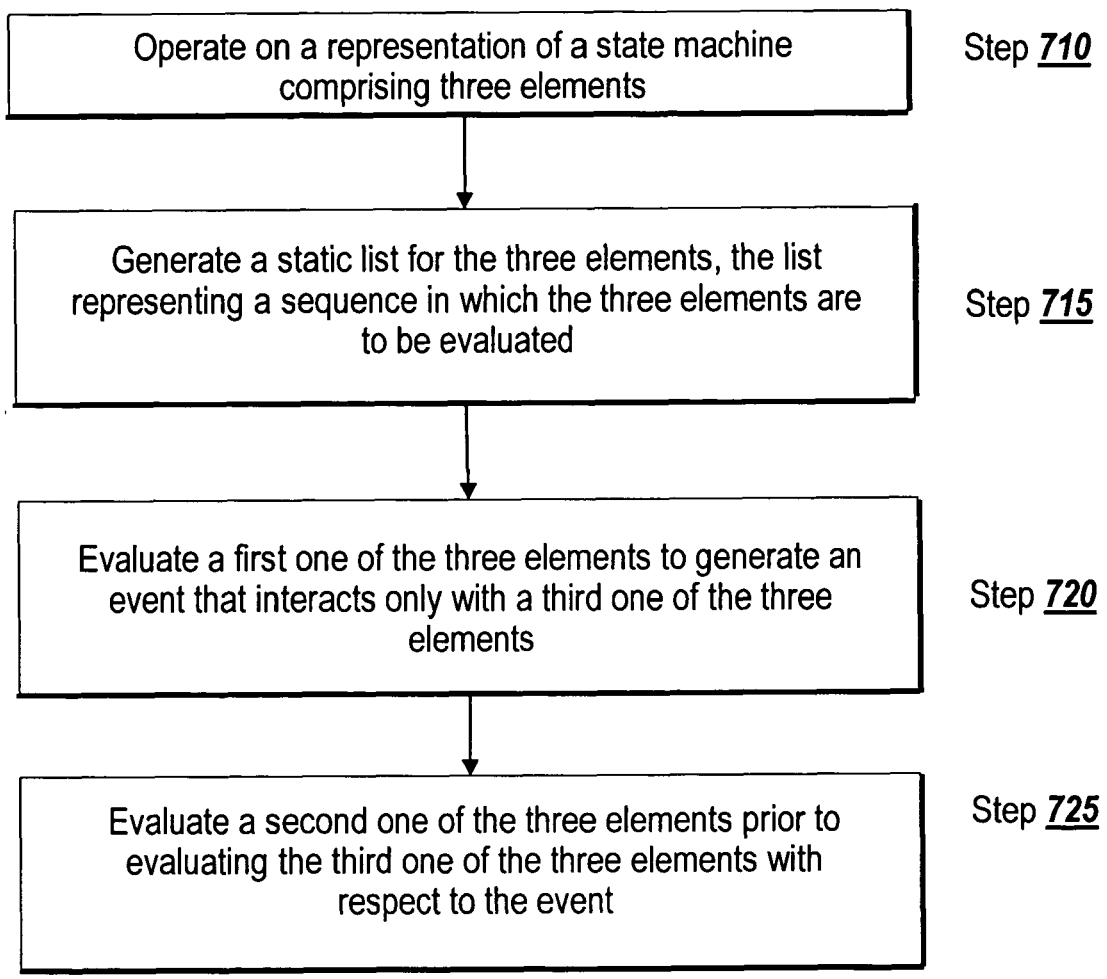
FIG. 7 is a flow chart illustrating exemplary processing related to evaluating a state diagram according to a predetermined sequence.
Figure 8:
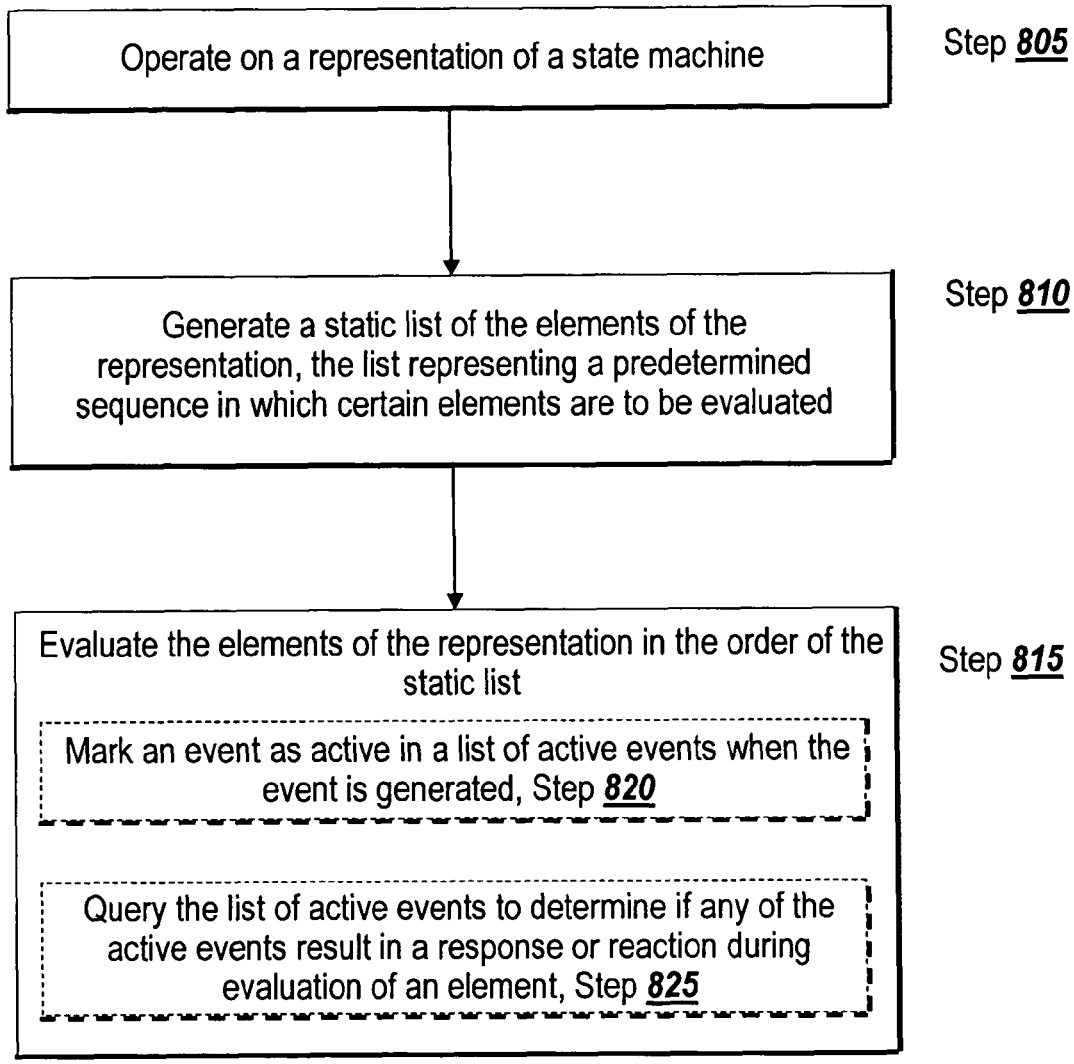
FIG. 8 is a flow chart illustrating exemplary processing related to evaluating a state diagram according to a predetermined sequence that may use a list of active events.

FIGS. 1-2C and 5A-5C illustrate an example embodiment of a system, a method, and a medium, wherein a local broadcast of a second local event triggered by a first event, within a state diagramming environment, occurs in a "non-blocking" fashion, such that the first event continues to be processed. FIGS. 7-8 illustrate an exemplary embodiment of a method for evaluating a representation of a state machine in a modeling environment, according to a predetermined sequence. These implementations may eliminate unwanted cyclic behavior due to recursive event broadcasts between parallel states. These implementations also may ensure that a parallel state is not processed repeatedly because of local event broadcasts between parallel states. A state diagram using "non-blocking" actions according to exemplary embodiments can be more readily translated into hardware than a state diagram using conventional "blocking" actions.

Although exemplary implementation will be described with reference to the figures, it should be understood that many alternative implementations are possible. It is, therefore, expressly noted that the present invention is not limited to these embodiments, but rather the intent is that additions and modifications to what is expressly described herein also are included within the scope of the invention. Moreover, it is to be understood that the features of the various embodiments described herein are not mutually exclusive and can exist in various combinations and permutations, even if such combinations or permutations are not made expressly herein, without departing from the spirit and scope of the invention.

An exemplary embodiment will be described for illustrative purposes relative to a state diagramming environment provided by the software products from The MathWorks, Inc. of Natick, Mass. Although the illustrative embodiment will be described relative to a Stateflow® based application, one of ordinary skill in the art will appreciate that the present invention may be applied to other state diagramming environments, such as any environment using software products of LabVIEW® or MATRLXX® from National Instruments, Inc, RHAPSODY® and STATEMATE®, from iLogix, Inc. of Toronto acquired by Telelogic, Inc. of Malmö, Sweden, DYMOLA® from Dassault Systèmes of Surnes, France, a mixed-block diagram/statechart modeling and simulation environment such as SIMPLORER® from Ansoft Corporation of Pittsburgh, Pa., a data flow diagram environment or a UML or SysML modeling environment, a block diagram based discrete-event and finite-state machine modeling environment such as Ptolemy Classic from U.C. Berkeley of Berkeley, Calif., ACSL Graphic Modeller™ from AEgis Technologies Group, Inc. of Huntsville, Ala., Saber® software from Synopsis, Inc. of Mountain View, Calif., Cadence Incisive™ from Cadence Design Systems, Inc. of San Jose, Calif., or System Vision™ from Mentor Graphics Co. of Wilsonville, Oreg. Additionally, one skilled in the art would recognize that in accordance with the illustrative embodiment Petri net, state transition tables, condition/event system, Bayesian nets, etc., representations may be used. Additionally, entity flow diagramming applications, which are state diagramming applications with implicit states, such as that SimEvents™ from The Mathworks, Inc. of Natick, Mass., Extend™ from Imagine That, Inc. of San Jose, Calif., WITNESS from Lanner Group, Ltd. of Redditch, United Kingdom, and Simul8™ from NovaSim, LLC of Bellingham, Wash. may also be used. A state diagramming application is an application that includes any graphical model that includes discrete state and events to change the state. The states may be explicit, such as in a state transition diagram, but also implicit, such as in a server/queue diagram or entity flow diagram. Although the illustrative embodiment is described relative to a graphical state diagramming application, the present invention may also be applied to any application for finite state representation such as non-graphical textual state applications.

Figure 1:
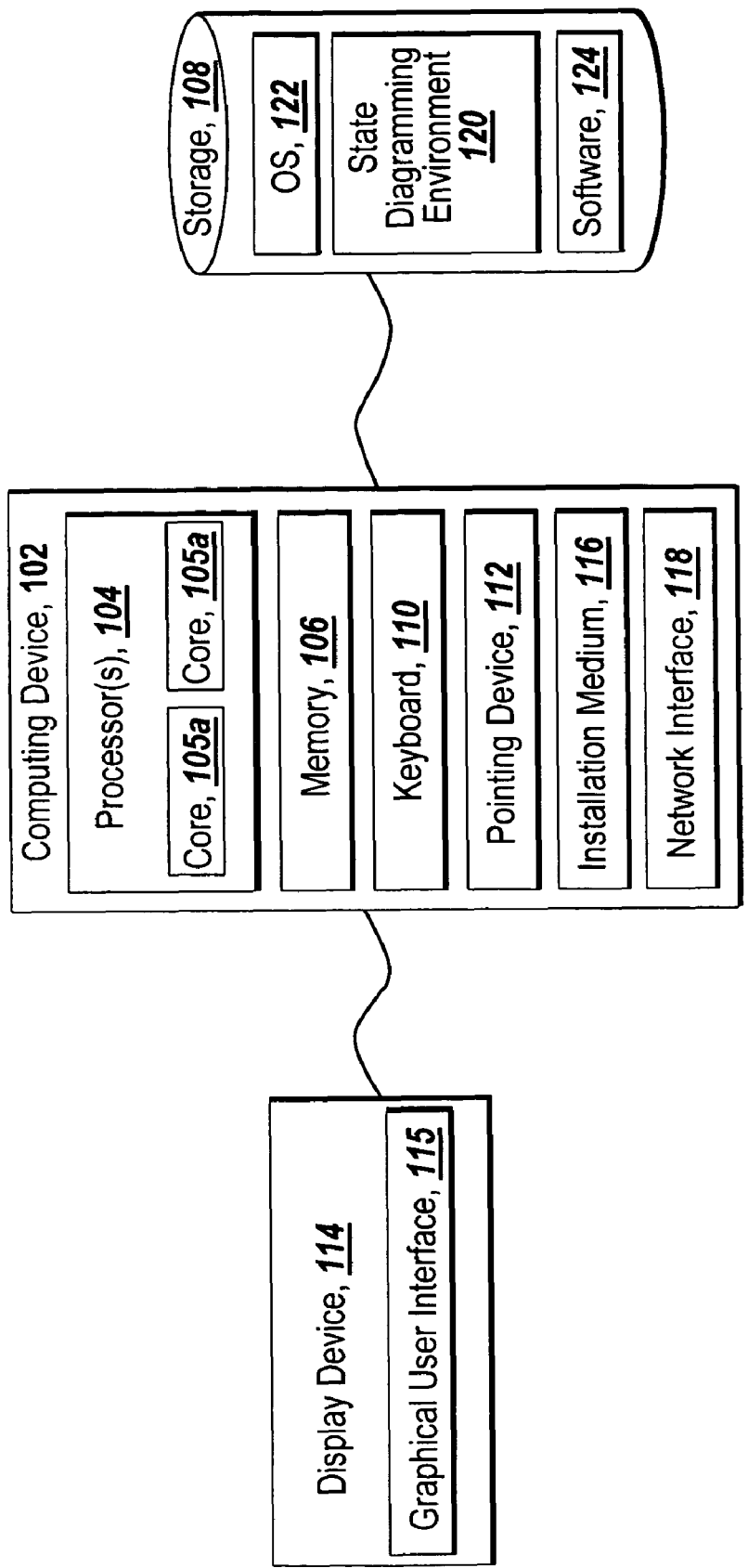
FIG. 1 is a block diagram of an illustrative computing device for practicing an embodiment of the present invention.

FIG. 1 depicts an environment suitable for practicing an illustrative. According to one embodiment of the present invention, the environment includes a computing device 102 having memory 106, on which software may be stored, one or more processor(s) (CPU) 104 for executing software stored in the memory 106, and other programs for controlling system hardware. The one or more processor may have more than one core 105a 105b each. The computing device 102 may also incorporate a hardware accelerator. The memory 108 may comprise a computer system memory or random access memory such as dynamic random access memory (DRAM), static random access memory (SRAM), magnetoresistive random access memory (MRAM), extended data out random access memory (EDO RAM), etc. The memory 106 may comprise other types of memory as well, or combinations thereof. A human user may interact with the computing device 102 through a visual display device 114 such as a computer monitor, which may be used to display a graphical user interface (GUI) 115.

The computing device 102 may include other I/O devices such a keyboard 110 and a pointing device 112, for example a mouse, for receiving input from a user. Optionally, the keyboard 110 and the pointing device 112 may be connected to the display device 114. Additionally, the computing device 102 may include any type of input device for receiving user input, such as a joystick, a neural interface device, a microphone, etc. In other embodiments, the computing device 102 may include any type of haptic or tactile feedback device, such as a vibration generating mouse, or a force feedback device such as a force feedback joystick. Also, the computing device 102 may include any type of sound producing I/O device such as any suitable sound card and a speaker. The computing device 102 may include other suitable conventional I/O peripherals, e.g. network interface cards analog to digital/digital to analog converters, etc.

For installing/storing software programs, the computing device 102 may support any suitable device readable medium 116, such as a CD-R, DVD-R floppy disks, tape device, USB device, hard-drive, or any other suitable device. The computing device 102 may further comprise a storage device 108, such as a hard-drive or CD-ROM, for storing an operating system 122 and other related software 124 and executable instructions. The state diagramming environment 120 may comprise software that is installed via a device readable medium 116 and stored in the storage device 108. Additionally, the operating system and state diagramming environment 120 can be run from a bootable CD, such as, for example, KNOPPIX®, a bootable CD for GNU/Linux.

Additionally, the computing device 102 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), cluster interconnection (Myrinet), peripheral component interconnections (PCI, PCI-X), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 118 to any type of network capable of communication and performing the operations described herein. Moreover, the computing device 102 may be any computer system such as a workstation, desktop computer, server, laptop, notebook, smartphone, handheld computer, smart sensor and actuator, or other form of computing or telecommunications device that is capable of communication and that has sufficient processor power and/or memory capacity to perform the operations described herein.

Figure 2A:
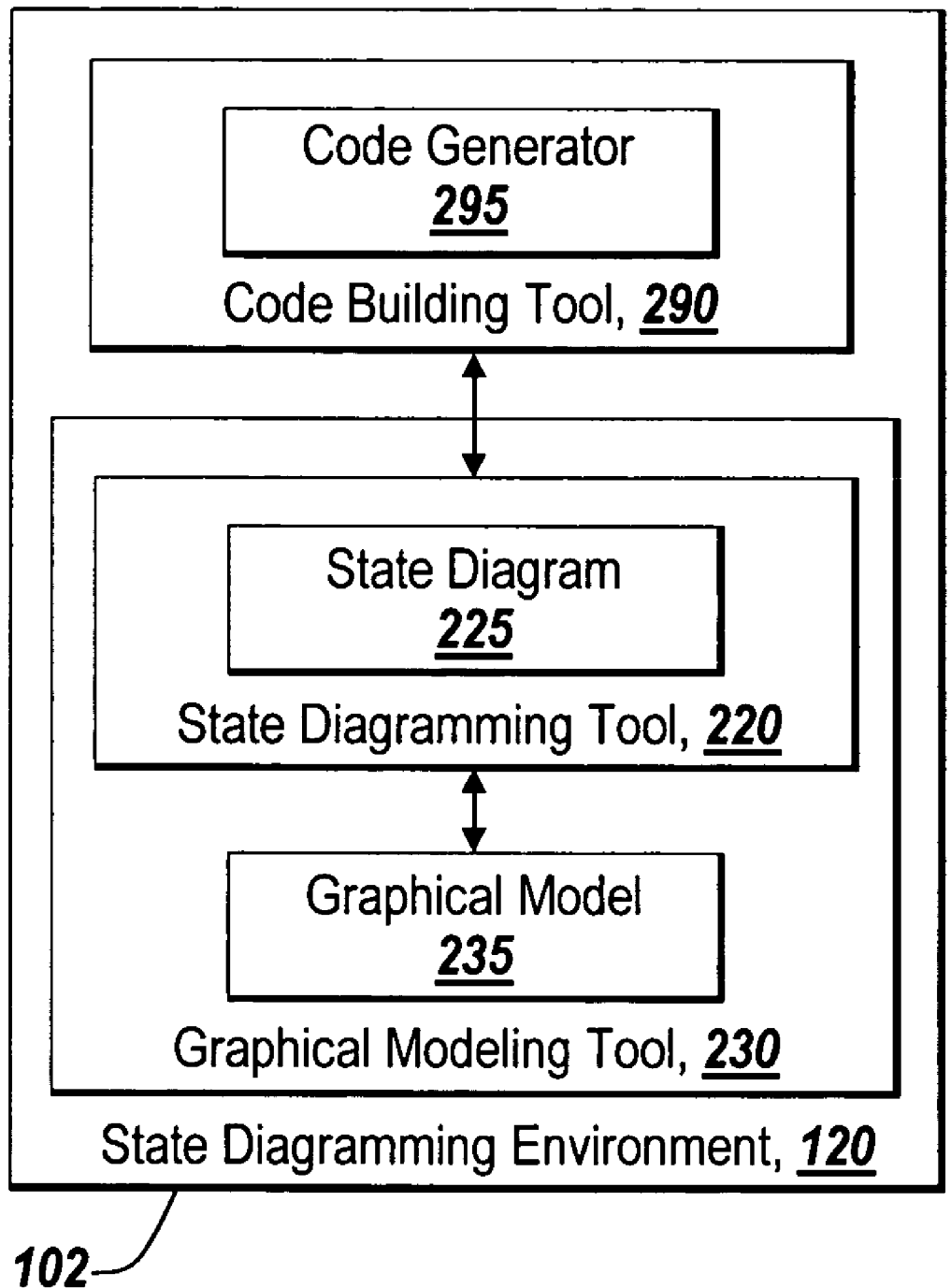
FIG. 2A is a block diagram of an illustrative state diagramming environment for practicing an embodiment of the present invention on the computing device of FIG. 1.

In one aspect, the present invention is related to a state diagramming environment 120 as illustrated in FIG. 2A. In brief overview, the illustrative state diagramming environment 120 may include a state diagramming tool 220, a graphical modeling tool 230, and a code building tool 290. The state diagramming tool 220 provides an environment for the design, development, testing, simulation, and execution of a state diagram model 225. The graphical modeling tool 230 provides an environment for the design, development, testing, simulation, and execution of a graphical model 235, such as a block diagram model. The graphical modeling tool 230 may also provide for incorporating or referencing a state diagram model 225 via the graphical model 235. The code building tool 290 may include a code generator 295 to provide for the code generation and building of executable forms of the state diagram model 225 and/or graphical model 235. The state diagramming tool 220 may be in communication with the graphical modeling tool 230 via any suitable type and form of interface. The code building tool 290 may be in communication with or otherwise have any suitable type and form of interface to the state diagramming tool 220 and/or the graphical modeling tool 230.

The illustrative state diagramming tool 220 of the present invention may include a design and development environment for creating any type and/or form of state diagram model 225, which may also be referred to as a state machine diagram model, a state diagram, a statechart or chart. In an exemplary embodiment and by way of example, the state diagramming tool 220 may comprise Stateflow® by The MathWorks, Inc. of Natick, Mass. In the exemplary embodiment of Stateflow®, the state diagram model 225 may be referred to as a Stateflow® chart. Stateflow® integrates with graphical modeling tools, such as Simulink® by The MathWorks, Inc. of Natick, Mass., to model, simulate, and analyze systems. In one embodiment, Stateflow® provides for the design and development of deterministic, supervisory control systems in a graphical environment. The state diagramming tool 220 provides for a state machine representation, flow diagram notations, an action language, graphical functions, truth tables, and state-transition diagrams all in the same diagram model 225.

A state diagram model 225 may comprise a graphical representation of a state machine, such as either a finite state machine or a non-deterministic state machine, where states and transitions form the building blocks of a system. As known to those ordinarily skilled in the art, a state machine may be a representation of an event driven system where the system makes a transition from one state to another state provided any conditions associated with the transition are met. A state may be a mode of behavior that can be either active or inactive based on inputs, outputs, transitions, and conditions. A transition links one state to another state and may have a condition, such as any logic, computation, algorithm, or executable instruction, used to determine if and when a transition between states may occur.

In some embodiments of the state diagram model 225, any of the states may be specified to have either a parallel (AND) or an exclusive (OR) decomposition with respect to any sub-states associated with a state, such as in the illustrative embodiment of Stateflow® as the state diagramming tool 220. A state with a parallel decomposition may comprise one or more sub-states that are active at the same time when the state is active and/or another sub-state is active. For example, one or more selected sub-states may be active in parallel or at the same time when the state is active. A state with an exclusive decomposition may comprise only one sub-state that is active when the state is active. One ordinarily skilled in the art will recognize and appreciate how states and sub-states may be specified or configured to operate in a parallel or exclusive manner.

The state diagramming tool 220 may provide elements such as states, junctions, and functions, such as graphical functions of Stateflow®, that may be placed and arranged graphically in a window, design area or otherwise collectively in a state diagram model 225. States and junctions may be connected together in the state diagram model 225 to form flows and transitions for an implementation of a state machine. The state diagramming tool 220 and/or state diagram model 225 may provide for parallelism in that two or more orthogonal states may be active at the same time. Additionally, the state diagramming tool 220 and/or state diagram model 225 may provide a mechanism for specifying transitions and/or conditions based on historical information related to execution of the state diagram model 225. Additionally, the state diagramming tool 220 and/or state diagram model 225 may use any type and/or form of graphical element to visually represent elements, such as for state machine representation, in a state machine diagram model 225.

Figure 2B:
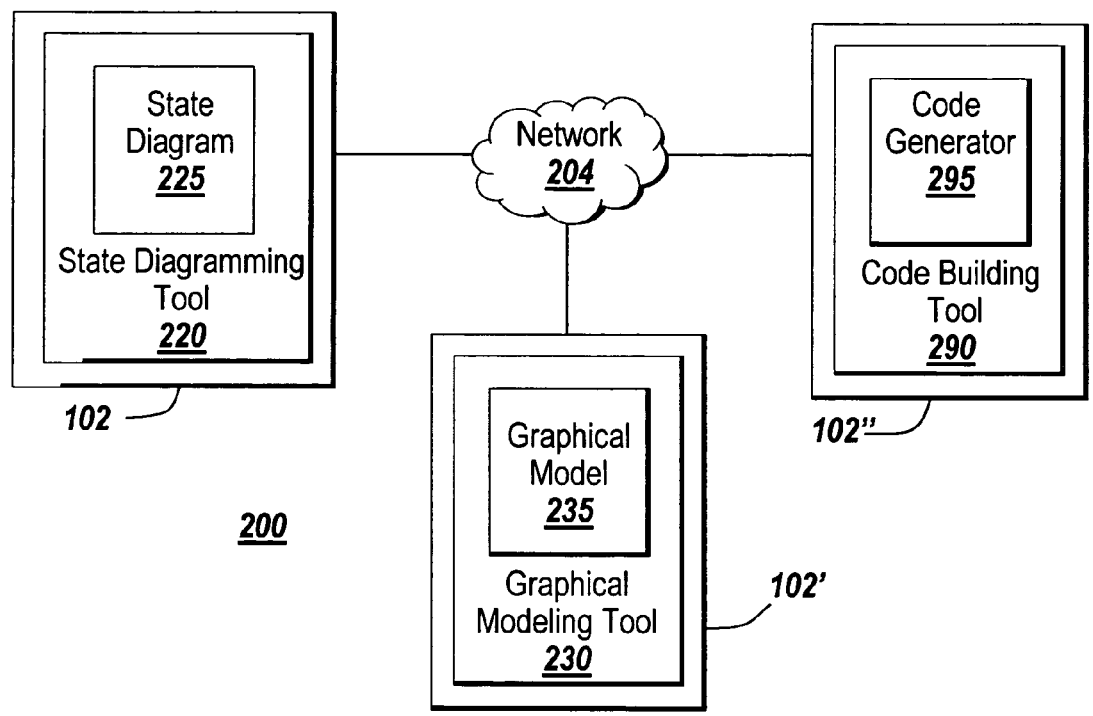
FIG. 2B is a block diagram of another illustrative state diagramming environment for practicing an embodiment of the present invention in a network environment.

FIG. 2B depicts another environment suitable for practicing an illustrative embodiment of the present invention, wherein portions of the present invention are distributed in a network environment. In a broad overview, a system 200 depicts a network 204 environment for running portions of the state diagram modeling environment 120 of the present invention on multiple computing devices 102, 102' and 102". The system 200 includes multiple computing devices 102, 102', and 102" connected to and communicating over a network 204. The state diagram modeling tool 220, graphical modeling tool 230, and code building tool 290 can be capable of and configured to communicate to each other over the network 204 by any suitable means and/or mechanisms. In some embodiments, the state diagram modeling environment 120 may use the MATLAB® Distributed Computing Toolbox and Distributed Computing Engine to distribute and process operations of the present invention described herein.

The network 204 can be a local area network (LAN), such as a company Intranet, a metropolitan area network (MAN), or a wide area network (WAN) such as the Internet. In one embodiment (not shown), the network 204 includes separate networks, which may be of the same type or may be of different types. The topology of the network 204 over which the computing devices 102, 102', 102" communicate may be a bus, star, or ring network topology. The network 204 and network topology may be of any such network 204 or network topology capable of supporting the operations of the present invention described herein.

The computing devices 102, 102', and 102" can connect to the network 204 through a variety of connections including standard telephone lines, LAN or WAN links (e.g., T1, T3, 56 kb, X.25, SNA, DECNET), broadband connections (ISDN, Frame Relay, ATM, Gigabit Ethernet, Ethernet-over-SONET), cluster interconnections (Myrinet), peripheral component interconnections (PCI, PCI-X), and wireless connections, or some combination of any or all of the above. Connections can be established using a variety of communication protocols (e.g., TCP/IP, IPX, SPX, NetBIOS, Ethernet, ARCNET, Fiber Distributed Data Interface (FDDI), RS232, IEEE 802.11, IEEE 802.11a, IEEE 802.11b, IEEE 802.11g, and direct asynchronous connections).

The network 204 and network connections may include any transmission medium between any of the computing devices 102, 102', and 102" such as electrical wiring or cabling, fiber optics, electromagnetic radiation and/or via any other form of transmission medium capable of supporting the operations of the present invention described herein. The methods and systems of the present invention may also be embodied in the form of computer data signals, program code, or any other type of transmission that is transmitted over the transmission medium, or via any other form of transmission, which may be received, loaded into, and executed, or otherwise processed and used by a computing device 102, 102' and 102" to practice the operations of the present invention as described herein.

Each of the computing devices 102, 102', and 102" may be configured to and capable of running any portion of the state diagramming environment 120. The state diagramming environment 120 and/or any portion thereof, such as the state diagram modeling tool 220, graphical modeling tool 230, and code building tool 290 can be capable of and configured to operate on the operating system that may be running on any of the computing devices 102, 102', and 102". Each computing device 102, 102', and 102" can be running the same or different operating systems. Additionally, state diagram modeling tool 220, graphical modeling tool 230, and code building tool 290 can be capable of and configured to operate on and take advantage of different processors of any of the computing devices 102, 102', and 102". One ordinarily skilled in the art will recognize the various combinations of operating systems and processors that can be running on any of the computing devices.

Figure 2C:
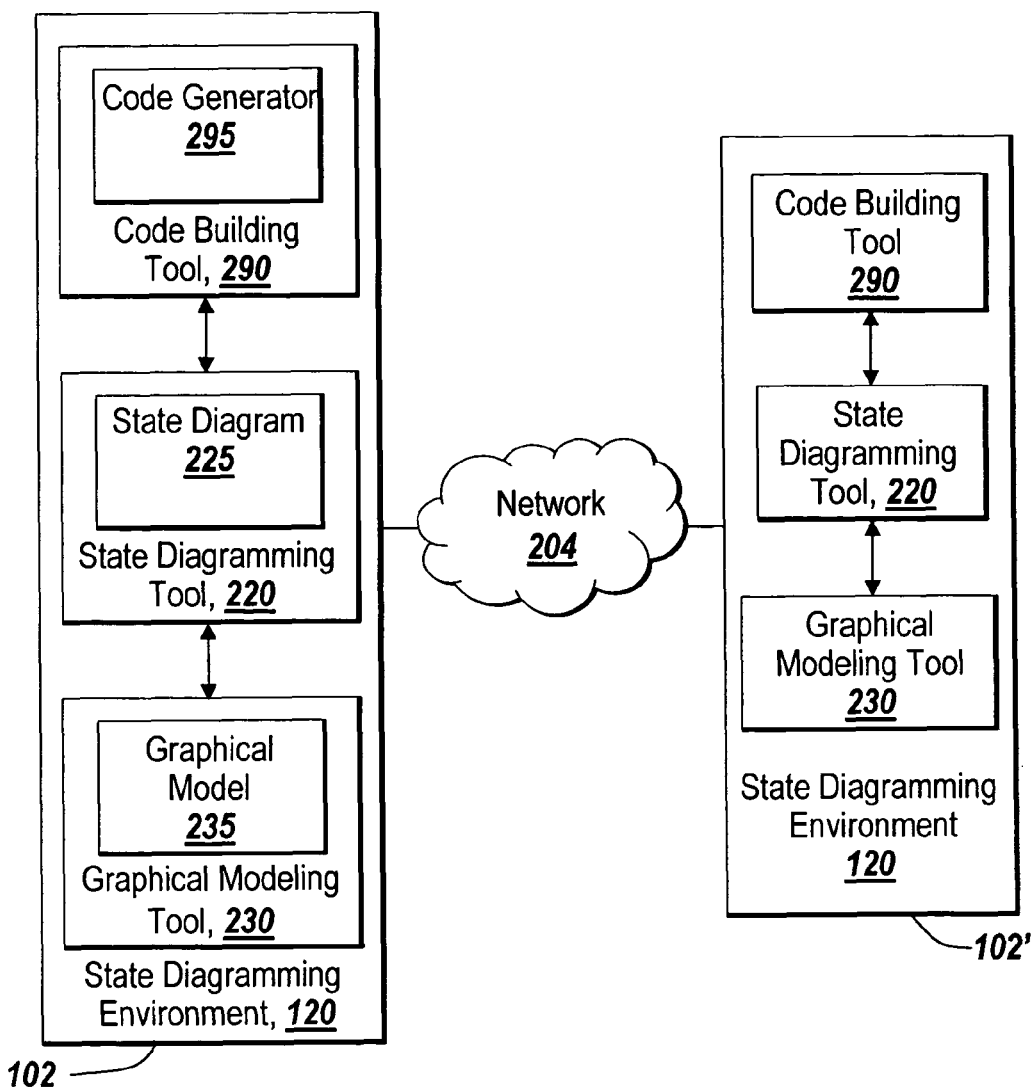
FIG. 2C is a block diagram of another illustrative state diagramming environment for practicing an embodiment of the present invention in a distributed environment.

FIG. 2C depicts another illustrative environment of the present invention, wherein portions of the present invention are practiced in a client/server architecture in a network environment. In a broad overview, the illustrative state diagram modeling environment 120 of the present invention includes a client computing device 102 connected to and in communication with a server computing device 102' over a network 204. The state diagramming tool 220, graphical modeling tool 230 and/or code building tool 290, can be capable of and configured to have respective portions run on each of the client 102 and the server 102'. In one embodiment, the state diagram modeling tool 210 may have a first portion running on the client 102 and a second portion 210' running on the server 102'. For example, the state diagram modeling tool 210 may have a client portion 210 on the client 102 for providing and displaying the state diagram model 225, and a server portion 210' on the server 102' that may include application functionality and other processing, such as storing and/or retrieving portions of the state diagram model 225 from a database. Likewise, in other embodiments, the graphical modeling tool 230 may also have a client portion 230 and a server portion 230', and the code building tool 290, a client portion 290 and a server portion 290'. One ordinarily skilled in the art will recognize and appreciate how the state diagram modeling tool 220, graphical modeling tool 230, and/or code building tool 290 may be capable of and configured to execute with a client portion and a server portion in a client/server architecture.

Additionally, the state diagram modeling tool 220, graphical modeling tool 230, and/or code building tool 290 may be deployed such that portions of the graphical model 235 and/or state diagram model 225 may execute on certain portions of the network 204 and/or on certain computing devices 102, 102', or 102". For example, some functionality of the graphical model 235 and/or state diagram model 225 may be time critical or sensitive, and therefore may be targeted to execute on a computing device 102, 102' and 102" and a segment or portion of the network 204 with desired performance and/or operating characteristics. Other functionality of the graphical model 235 and/or state diagram model 225 may not be time-sensitive and may be targeted to be deployed to any computing device 102, 102', and 102" available on the network 204.

A state diagram may be used to represent finite state machines. Finite state machines may be used to represent event-based systems. Finite state machines may also be used to describe reactive systems. In an event-driven or reactive system, the system transitions from one mode or state to another prescribed mode or state, provided that the condition defining the change is true. An example of an event-based system may be an electric circuit that has memory. In this manner, a finite state machine may be used in the design of a sequential circuit, which in general, is a circuit that uses combinational logic and a memory component. The output and next state of a finite state machine may be a function of the present state of and/or the inputs to the finite state machine. Generally, there are three main types of finite state machines that are used to develop a synchronous sequential circuit, a Moore machine, a Mealy machine and a generic state machine.

A state diagram model may comprise a graphical representation of a state machine, such as either an infinite state machine, a finite state machine, a non-deterministic state machine, or a probabilistic state machine (e.g., a Bayesian net or a Markov model), where states and transitions form the building blocks of a system. As known to those ordinarily skilled in the art, a state machine may be a representation of an event driven system, where the system makes a transition from one state to another state provided conditions associated with the transition are met. Further, one of ordinary skill in the art will recognize that other graphical formalisms may be used to represent state machines. Petri nets, state transition diagrams and state transition tables may also be used to represent state machines, thus, Petri nets, state transition diagrams and state transition tables, as well as statecharts, are encompassed by the illustrative embodiment of the present invention A state diagram can include states, junctions, and transitions. A state diagram, or statechart, can use a "state" to represent the mode of an object in an instant in time. A state can be graphically represented as a rectangle with rounded corners. A state may be a mode of behavior that can be either active or inactive based on inputs, outputs, transitions, and conditions. A transition links one state to another state and may have a condition, such as logic, a computation, an algorithm, or an executable instruction, used to determine if and when a transition between states may occur. Transitions may be represented as arrows between states. These "transitions" can be triggered by "events". In turn, the transition can send an event to a state where it can be evaluated by the contents of that state. "Actions" take place during the execution of a state diagram. There can be three types of actions: an action that occurs upon entering a state (entry action); while in the state (during action); and upon leaving the state (exit action). In addition, there can be actions associated with transitions and junctions as well.

A condition enables an action or transition, and an event triggers an action or transition. If a condition associated with an action or transition is true and an event that can trigger the action or transition (the triggering event) occurs then the action or transition may occur. If a condition associated with an action or transition is true and the triggering event doesn't occur then the action or transition will not occur. If a condition associated with an action or transition is not true then the action or transition does not occur regardless of whether or not the triggering event takes place, because the action or transition is not enabled.

Within some state diagrams, the state is implicit and not explicit. For example, an entity flow diagram such as a server/queue system has a discrete state but it is not explicitly modeled. In the entity flow diagram the implicit state changes in response to events. Embodiments of the current invention may also be applied to state diagrams in which the state is explicit and to state diagrams in which the state is implicit.

The state diagramming environment 120 may allow a state to be composed of multiple states and/or state diagrams. A hierarchy of states may be created where a global state is at the top of the hierarchy. State diagrams that are hierarchical are often referred to as statecharts. A state within a state is sometimes referred to as a sub-state. A state that includes other states is referred to as a super-state or a parent state. The sub-states within the super-state (or parent state) are also known as its children, its child states or its descendants. In this manner, a hierarchy may be created in a super-state such that each super-state may be composed of several levels of state diagrams. Using top down semantics upon entry of a state that has a hierarchy of states, the execution begins at the highest level (i.e., the top) of the hierarchy and continues to execute each subsequent lower level until it reaches the lowest level. Bottom-up semantics can be used for entering states and/or for exiting states, however, the illustrative embodiments of the present invention are described with respect to top-down entry semantics.

Transitions can be categorized as "inner transitions" or "outer transitions". An inner transition is a transition that does not exit the source state. In contrast, an outer transition is a transition that exits the source state.

When a state "wakes up" or becomes active it performs a number of operations. First it checks to see if any outer transitions are valid, and, if there is a valid outer transition, makes the transition. If there is no valid outer transition, then the state executes its "during" action. If there is no specified during action then the state checks to see if there are any valid inner transitions, and, if there is a valid inner transition, makes that transition. If there are no inner transitions, then the state wakes up its substates.

A wakeup of a chart or a state is the point at which the chart or state is evaluated. A state may be active, inactive or active with a certain probability. The active or inactive condition is independent of whether the chart or state is awake or asleep. A state may be active and asleep. The evaluation (or wakeup) of a chart can be initiated by the user, by another software environment, by a modeling environment, by a system call by a computer or by the state diagramming environment itself.

States within a state diagram may be "AND" states, also known as parallel states, or "OR" states. Only one OR state, denoted by a solid outline in Stateflow® (a product of The MathWorks, Inc.), is active at once. In contrast, multiple parallel states, denoted by dotted outlines in Stateflow, may be active simultaneously.

An originator of a broadcast is not necessarily connected to a receiver of the broadcast by a transition. A broadcast can be used to send an event between objects that are not connected by a transition. A broadcast action may be associated with a state, a transition, a junction, or a history junction. A broadcast may send the event to some or all of the states within its scope. A local broadcast may send an event to the parent state of the event that triggered it and/or to the other descendents of parent state. A directed broadcast sends a specific event to a specific receiver state. The broadcast may be executed using a "send" command. The send command has two parameters: the event to be sent and the destination state. If the destination state of the send command is active, it will be awakened. In conventional applications a local broadcast may be immediate and "blocking", i.e. the currently active event is suspended and the destination state is executed with the new event as the active event. A "send" command wakes up the destination state of the "send" command. The destination state then executes according to the steps detailed above: outer transitions, during action, inner transitions and wake up substates. Processing may return to the active event that sent the broadcast when the destination state execution is completed. The examples in the figures show broadcast actions associated with transitions between states. One skilled in the art will appreciate that the present invention is also applicable to broadcasts associated with other types of transitions, states, junctions and history junctions.

Figure 3A:
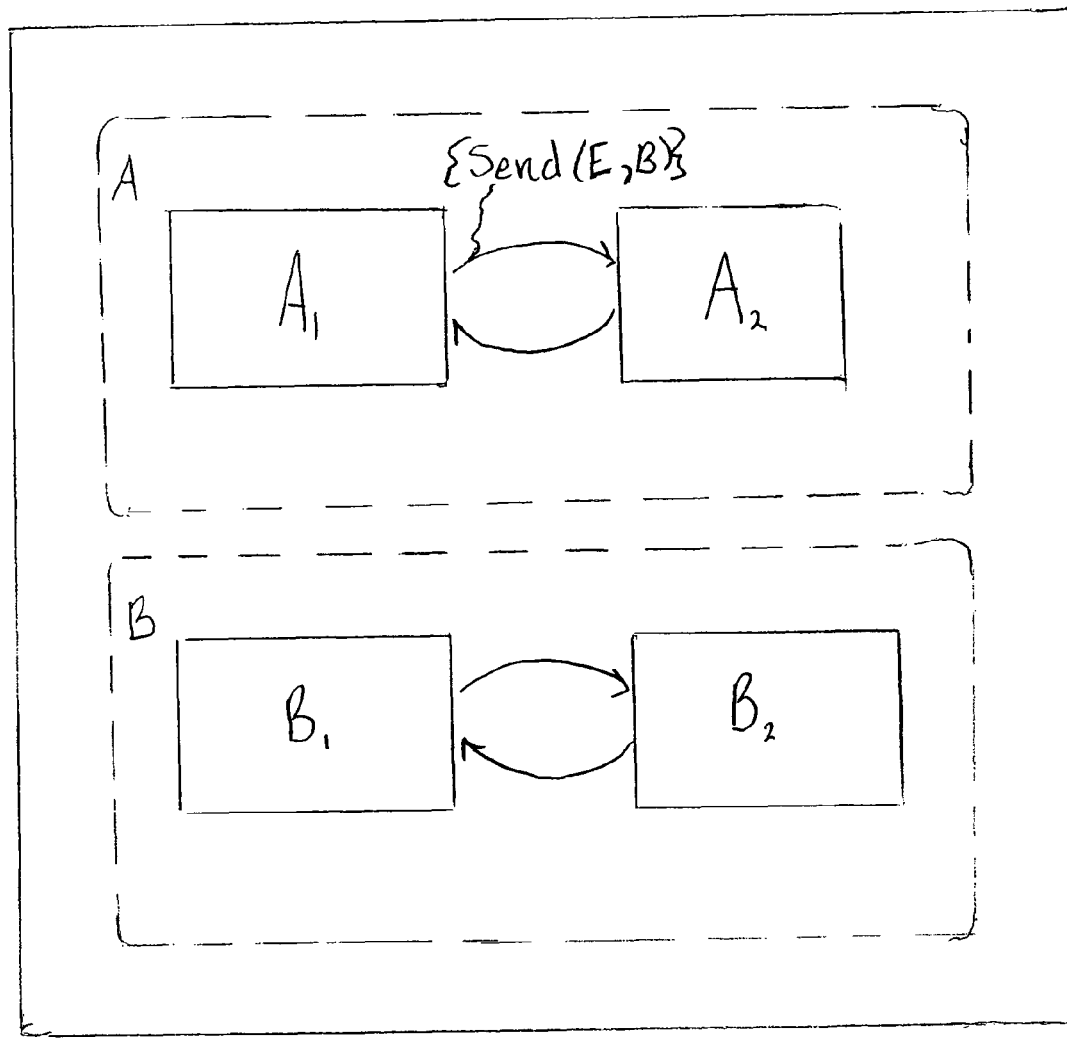
FIG. 3A is a state diagramming chart illustrating a local broadcast in a parallel state environment.

FIG. 3A illustrates a statechart with two parallel states, A and B. Both state A and state B contain substates; A contains substates A1 and A2, and B contains substates B1 and B2. Transitions between the states are represented by arrows. Initially, substates A1 and B1 are active. The transition from substate A1 to substate A2 triggers a local broadcast of event E to state B.

Figure 3B:
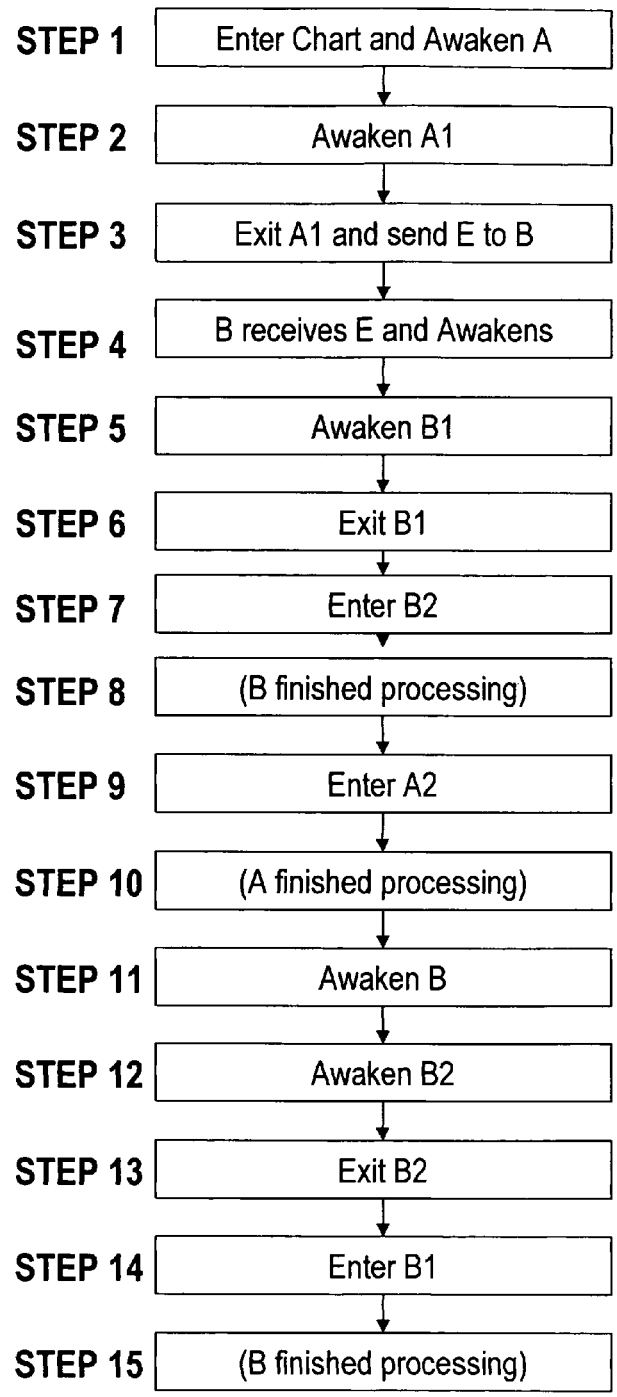
FIG. 3B illustrates a first exemplary blocking processing order for the chart shown in FIG. 3A.
Figure 3C:
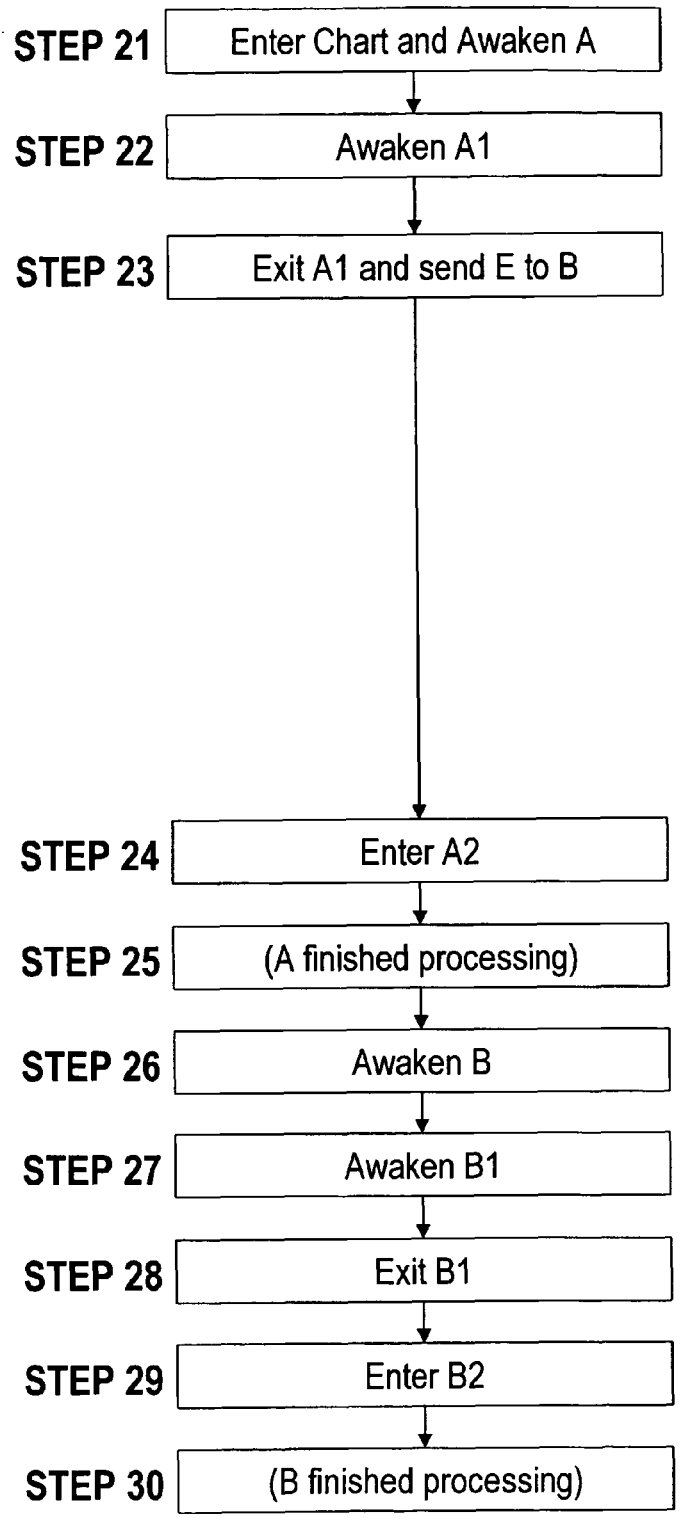
FIG. 3C illustrates an exemplary non-blocking processing order for the chart shown in FIG. 3A.

FIGS. 3B and 3C show the order of processing when the statechart represented in FIG. 3A becomes active. FIG. 3B illustrates how a blocking broadcast, of a local event between parallel states can lead to a state being processed twice. In contrast, FIG. 3C illustrates how a non-blocking broadcast between parallel states leads to each state being processed only once using an exemplary implementation.

Referring to FIG. 3B, when the chart of FIG. 3A becomes active, state A awakens (step 1). Next, substate A1 awakens (step 2). The process exits substate A1 and sends event E to state B (step 3). State B receives event E and awakens (step 4). Next, substate B1 awakens (step 5). For a blocking broadcast, the processing of state A is suspended until the processing of state B is completed. The process exits substate B1 (step 6) and then enters substate B2 (step 7). At this point, the processing of state B has been completed (step 8) so the process is returned to the previously suspended processing of state A. The process enters substate A2 (step 9). At this point the processing of state A is completed (step 10) and the chart continues with its normal processing order. This means that state B is awakened for the second time (step 11). Next, substate B2 is awakened (step 12). The process exits substate B2 (step 13) and enters substate B1 (step 14). The processing of B is finished (step 15). Processing for the chart is then completed. As can be seen in this example, state A is processed once, but, as a result of the blocking broadcast, state B is processed twice. Because of being processed twice, when the chart is finished processing, state B finishes processing with substate B1 as the active child.

The order of processing when the broadcast is non-blocking is illustrated in FIG. 3C. Initially, the chart is entered which awakens state A (step 21). The process then awakens substate A1 (step 22). The process exits substate A1 and sends the event E to state B (step 23). The process then completes the transition by entering A2 (step 24) and the processing of A is completed (step 25). The chart goes on to process state B. State B awakens (step 26) and then substate B1 awakens (step 27). The process exits substate B1 (step 28) and enters substate B2 (step 29). The processing of state B is then completed (step 30). In this non-blocking broadcast state B is only processed once. In contrast to the previous example using a blocking broadcast, in this example when the chart is finished processing, the state B finishes processing with the active child substate B2.

Figure 4A:
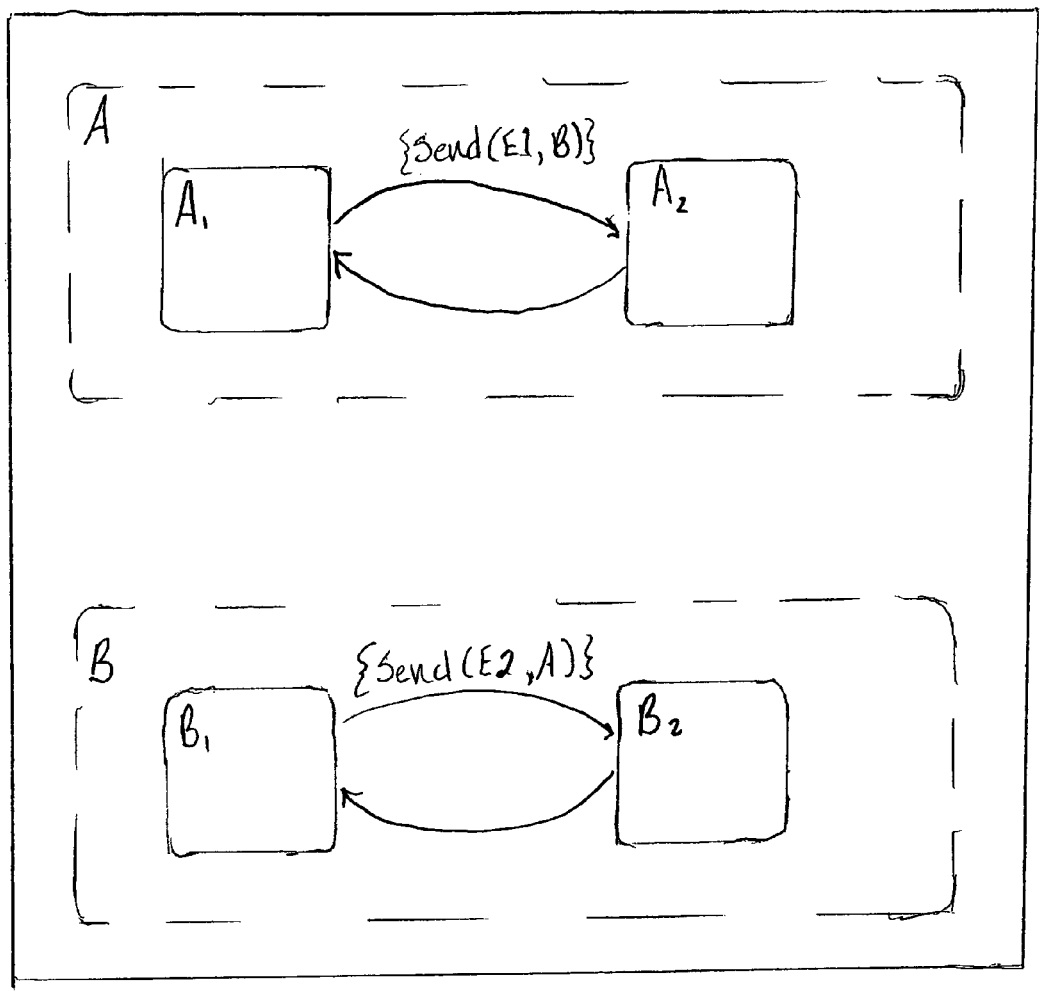
FIG. 4 is a state diagramming chart illustrating recursive broadcasts in a parallel state environment.
FIG. 4B illustrates an exemplary processing order for the chart shown in FIG. 4A.
FIG. 4C illustrates another exemplary processing order for the chart shown in FIG. 4A according to aspects of the present invention.
Figure 4B:
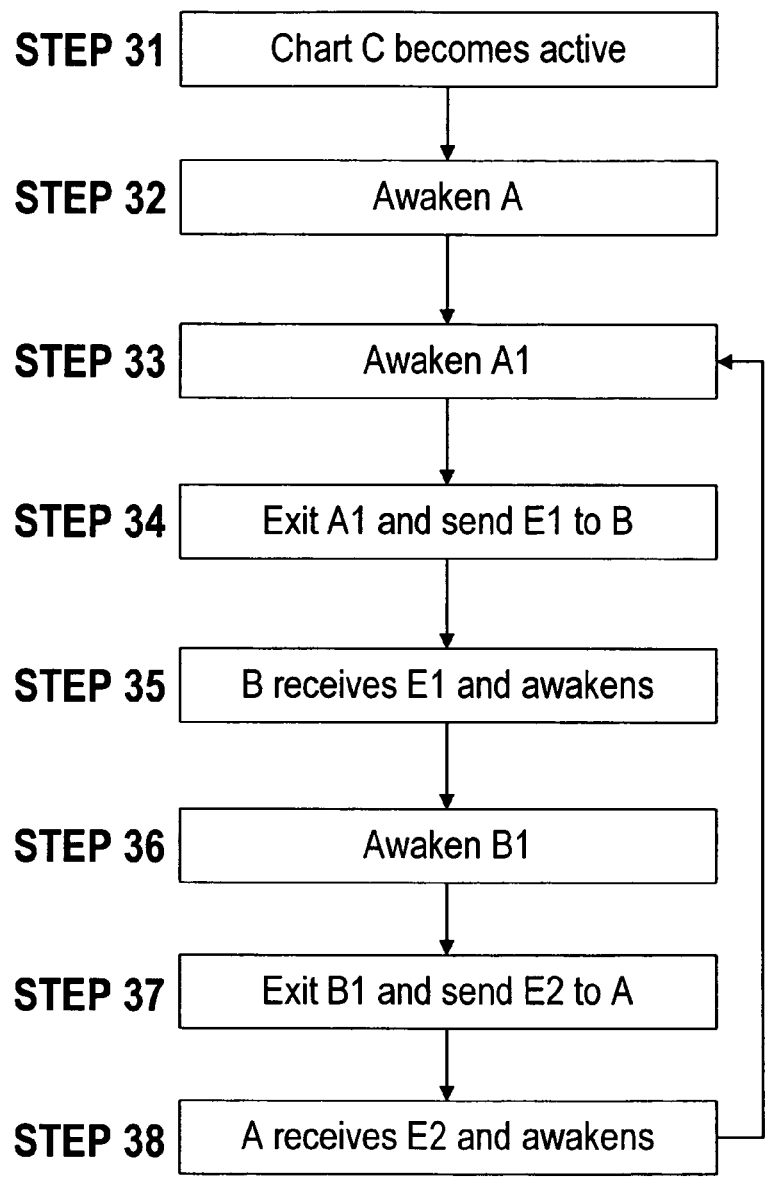
Figure 4C:
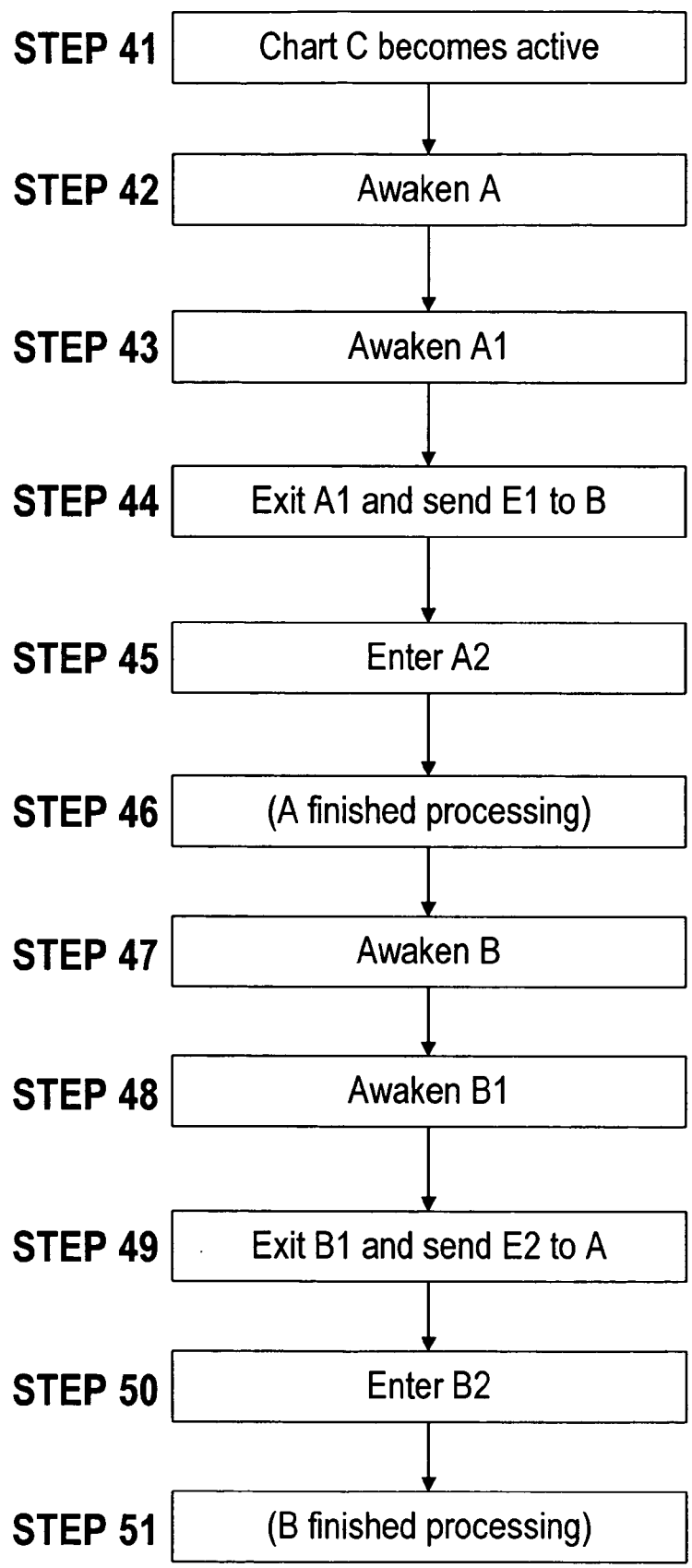

Another drawback to blocking broadcasts may be that they may lead to cyclic behavior that can be detected only during simulation. An example of how blocking broadcasting can lead to cyclic behavior follows. FIG. 4A shows a statechart with recursive broadcasts between parallel states that leads to cyclic behavior (infinite recursion). The statechart of FIG. 4A has two parallel states, A and B. Both of these states contain two substates, A1 and A2, and B1 and B2. The transition action associated with the transition from substate A1 to substate A2 is a broadcast of event E1 to state B. The transition action associated with the transition from substate B1 to substate B2 is the broadcast of event E2 to state A. FIG. 4B illustrates the order of processing when both of the broadcasts are blocking. FIG. 4C illustrates the order of processing when both of the broadcasts are non-blocking.

Referring to FIG. 4B, substates A1 and B1 are initially active. When the chart wakes up (step 31), the state A awakens (step 32). Next, substate A1 awakens (step 33). Initiation of the transition from substate A1 to substate A2 (exiting substate A1), causes a broadcast of event E1 to state B (step 34). This blocking broadcast suspends the further processing of state A until state B finishes processing. State B receives event E1 and awakens (step 35). Next, substate B1 awakens (step 36). Initiation of the transition from B1 to B2, exiting substate B2, causes the broadcast of event E2 to state A (step 37). This blocking broadcast suspends the further processing of state B until state A finishes processing. State A receives event E2 and awakens (step 38). Next, substate A1 awakens (step 33), thus, steps 33-38 are repeated in an infinite cycle. Each state is suspended by a broadcast during its transition from one substate to another. Neither transition can complete, leaving the system in an infinite loop.

FIG. 4C illustrates the behavior of the same chart if both of the transitions are non-blocking. Again, substates A1 and B1 are initially active. When the chart of FIG. 4A awakens (step 41), state A awakens (step 42), then substate A1 awakens (step 43). Initiation of the transition from substate A1 to substate A2 (exiting substate A1) causes the broadcast of event E1 to state B (step 44). Because the broadcast is non-blocking, the processing of state A continues. The process enters substate A2 (step 45). The processing of state A is completed (step 46). State B is awakened (step 47) and then substate B1 is awakened (step 48). The process exits substate B1 and sends event E2 to state A (step 49). Because the broadcast is non-blocking state B continues processing by entering substate B2 (step 50). The processing of state Brand of the chart is completed (step 51). FIG. 2C illustrates how non-blocking broadcasts avoid the infinite loops that can be caused by blocking broadcasts. The next time the chart awakens state A, the chart will process E2 as part of its normal activation.

In the blocking broadcast scenarios, when a first event triggers the broadcast of a second event, processing of the first event is blocked (or suspended) until the second event has finished being processed. Only after the second event has been completely processed does the processing of the first event continue. In contrast, exemplary implementations that operate with non-blocking broadcasts, may allow the first event to continue being processed after triggering the second event. The continued processing of the first event is not determined by the processing of the second event.

Figure 5A:
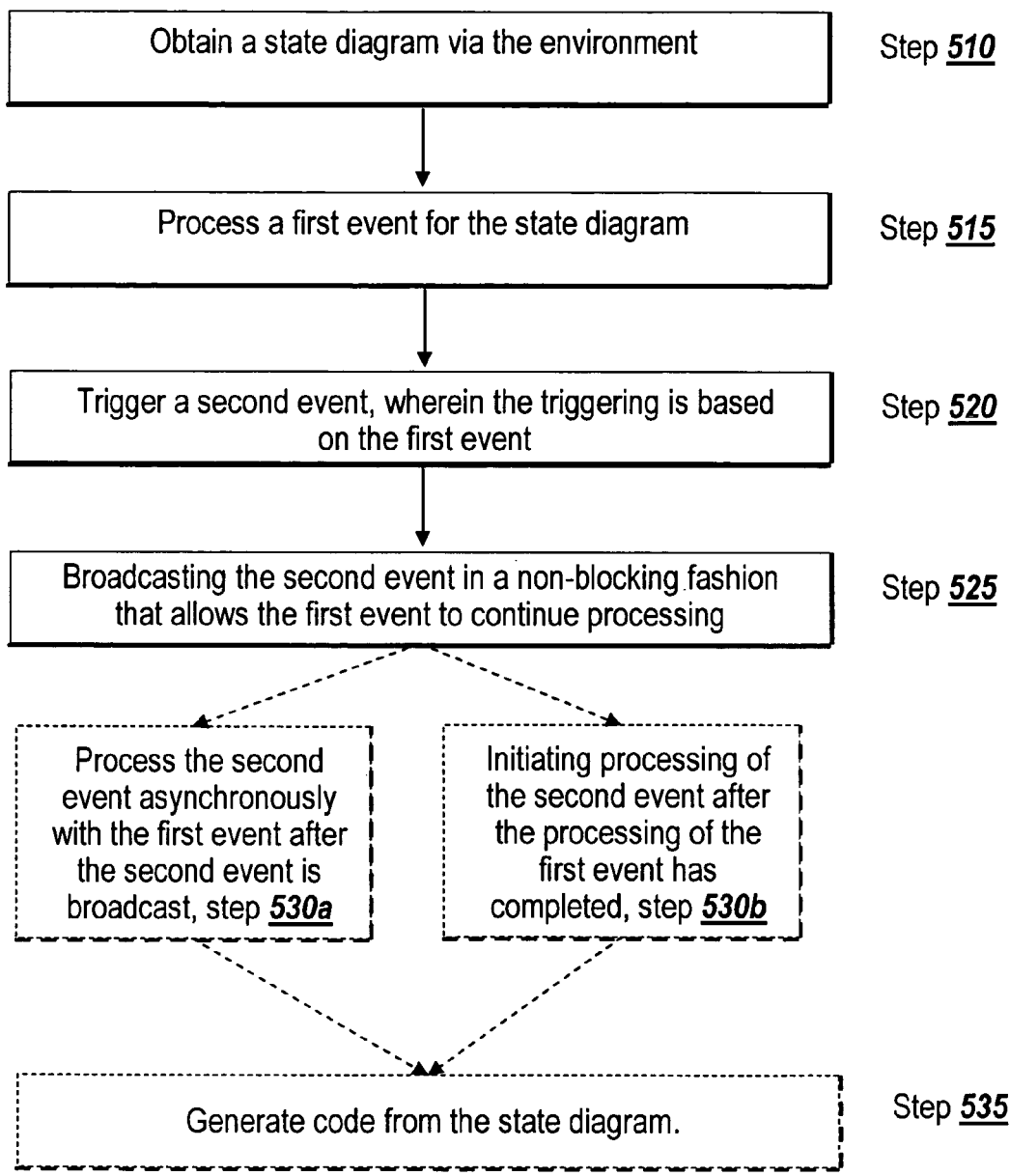
FIG. 5A is a flow chart illustrating exemplary processing related to broadcasting a local event in a non-blocking fashion.

FIG. 5A illustrates steps performed in broadcasting a local event in a non-blocking fashion, according to aspects of the illustrative embodiment. Initially, a state diagram is obtained via an environment for state diagramming (step 510). A first event is processed for the state diagram (step 515). A second event is triggered based on the first event (step 520). The second event is broadcast in a non-blocking fashion that allows the first event to continue processing (step 525). According to further aspects of the illustrative embodiment, the second event may be processed asynchronously with the first event after the second event is broadcast (step 530a). Processing of the second event may be initiated after the processing of the first event is completed (step 530b). Code may be generated from the state diagram (step 535). The code may be C, C++, Java, Javascript, a hardware description language (HDL) or any other suitable programming language.

Figure 5B:
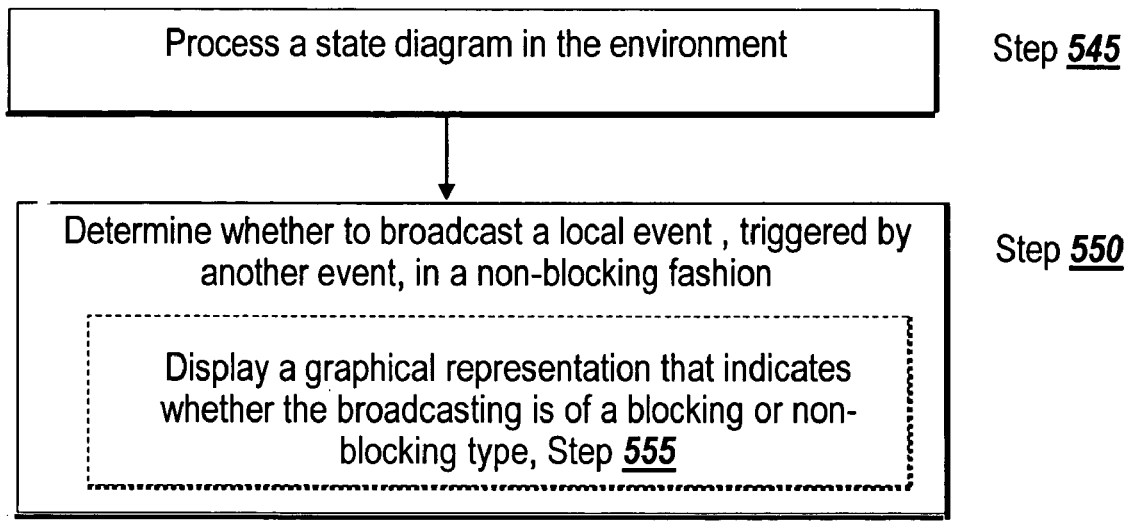
FIG. 5B is a flow chart illustrating exemplary processing related to determining whether to broadcast a local event in a non-blocking fashion.

FIG. 5B illustrates steps performed in determining whether to broadcast a local event in a non-blocking fashion, according to an aspect of the illustrative embodiment. Initially, a state diagram is processed in an environment for state diagramming (step 545). A determination is made whether to broadcast a local event, triggered by another event, in a non-blocking fashion that allows the another event to continue being processsed (step 550). According to further aspects of the illustrative embodiment, the determination may include displaying a graphical representation that indicates whether the broadcasting is of a blocking or non-blocking type (step 555).

Figure 5C:
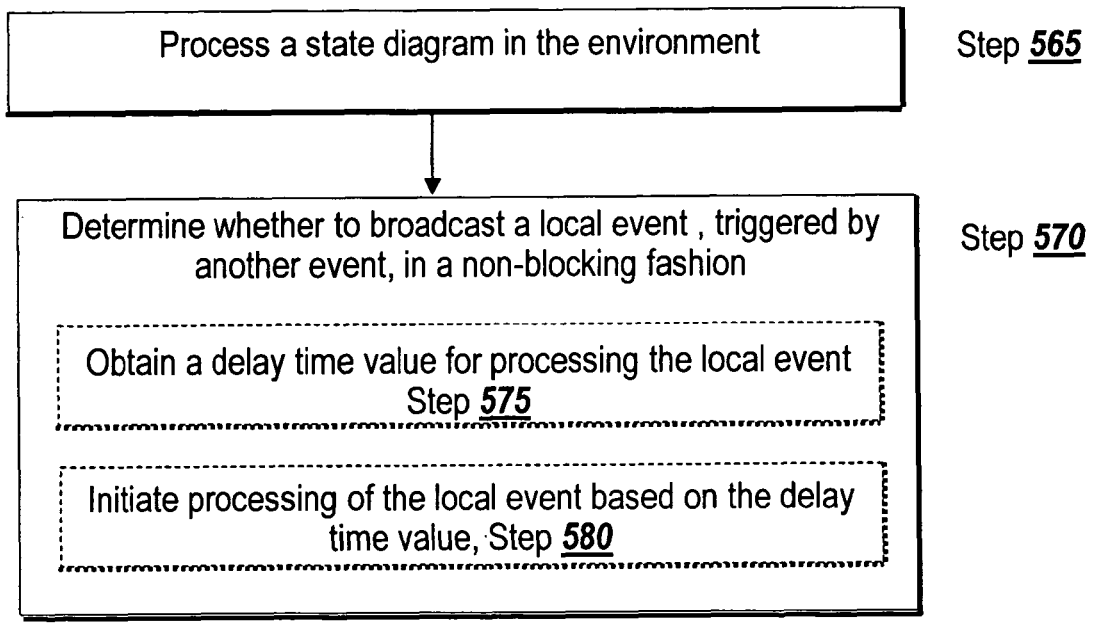
FIG. 5C is a flow chart illustrating exemplary processing related to determining whether to broadcast a local event in a non-blocking fashion where delays may be used.

FIG. 5C illustrates steps performed in determining whether to broadcast a local event in a non-blocking fashion where delays are used. Initially, a state diagram is processed in an environment for state diagramming (step 565). A determination is made whether to broadcast a local event, triggered by another event, in a non-blocking fashion that allows the another event to continue being processsed (step 570). According to further aspects of the illustrative embodiment, the determination may include obtaining a delay time value for processing the local event (step 575). It may also include initiating processing of the local event based on the delay time value (step 580). The delay time value may be specified in real time units, a number of chart wakeups, a determined number of clock cycles, relative time units or any other suitable measure of system time, simulation time or real time. The delay time value may be defined relative to the broadcast of the local event, the start of simulation, the last "wakeup" of the diagram, the next "wake-up" of the diagram, a particular time on the simulated time clock, a particular time on the real world clock, etc.

Whether a broadcast is blocking or nonblocking could be determined by the specific structure of the state diagram. For example, a local broadcast may be blocking if it is used by a single state, but non-blocking if it is only used by multiple states. A broadcast may be non-blocking if it is only sent up the hierarchy or a broadcast may be non-blocking only if it is only sent down the hierarchy. There are many more variations in the possible embodiments of this invention as may be appreciated by one of ordinary skill in the art.

In a conventional state diagramming environment, function calls of broadcast functions may be used to implement blocking broadcasts. Function calls are not well-suited for non-blocking broadcasts. A particular implementation of non-blocking broadcasts does not use function calls. Instead, every non-blocking broadcast has an associated boolean event variable. All of the event variables in a chart are reset to false at the start of execution of the chart. During execution, each non-blocking broadcast results in an Abstract Syntax Tree assigning an event variable associated with the broadcast to true. An Abstract Syntax Tree (AST) is a data structure that is the compiler's internal representation of a computer program from which code generation is performed. A transition triggered by a non-blocking broadcast results in an AST that checks if the value of the associated event is true. If the value is true the transition occurs.

Although one illustrative embodiment is directed to non-blocking broadcasts in a state diagramming environment, one of ordinary skill in the art will recognize that other types of diagrams of event-based models (such as Petri nets, entity flow diagrams, state transition diagrams and state transition tables) in other types of graphical modeling environments are encompassed by the present invention. Additionally, the present invention is not restricted to non-blocking event broadcasts.

In conventional techniques, elements of the diagram may be evaluated (processed) according to a predetermined sequence that is modified during evaluation by the generation of events. The generation and broadcast of an event "blocks" the predetermined evaluation sequence until the additional evaluation sequence of the generated and broadcast event is completed. Exemplary embodiments prevent this deviation from the predetermined (static) evaluation sequence by providing a new method of responding to event generation. According to aspects of the exemplary embodiments, during evaluation of the diagram, generation of an event may cause the generated event to be marked active in a list of active events. At any step in the sequence of evaluation of the elements of the diagram, the list of active events may be queried to determine if any of the active events result in a response or a reaction in the element being evaluated. The predetermined sequence of evaluation may be maintained because the group of active events stores information about generated events, the list may be queried at each step in the sequence of evaluation, and the evaluation at each step may react or respond to active events relevant to an element being processed in that step. This may allow users to design diagrams of event-based models without unexpected changes in the sequence of evaluation of elements in the prior art.

Figure 6A:
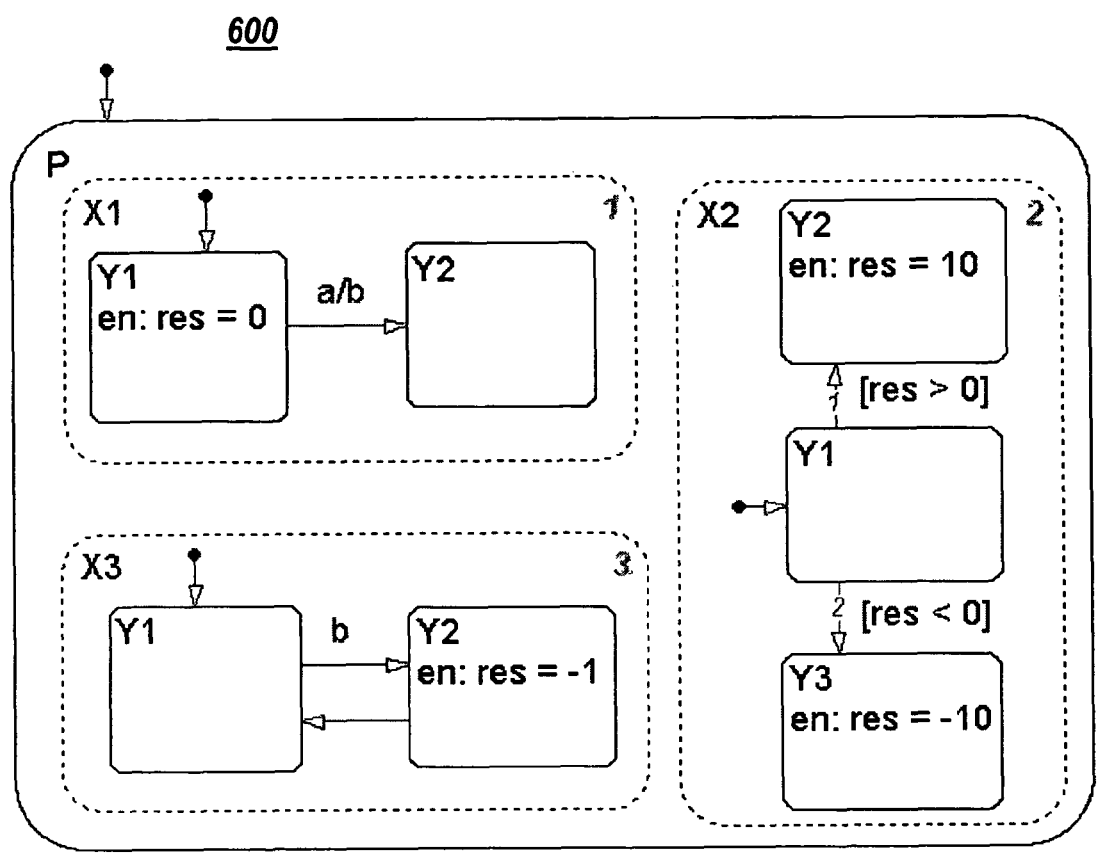
FIG. 6A is a state diagramming chart illustrating broadcasts between three parallel states.

FIG. 6A is a state diagramming chart used to illustrate an embodiment in which event generation may not alter the evaluation sequence of the chart. The statechart 600 has three parallel states X1, X2, and X3 which are substates of the parent state P. Each of these states X1, X2 and X3 has its own substates which are also statecharts by themselves. The three parallel states are ordered by their place in the evaluation sequence; state X1 will evaluate first, state X2 second and state X3 third.

Figure 6B:
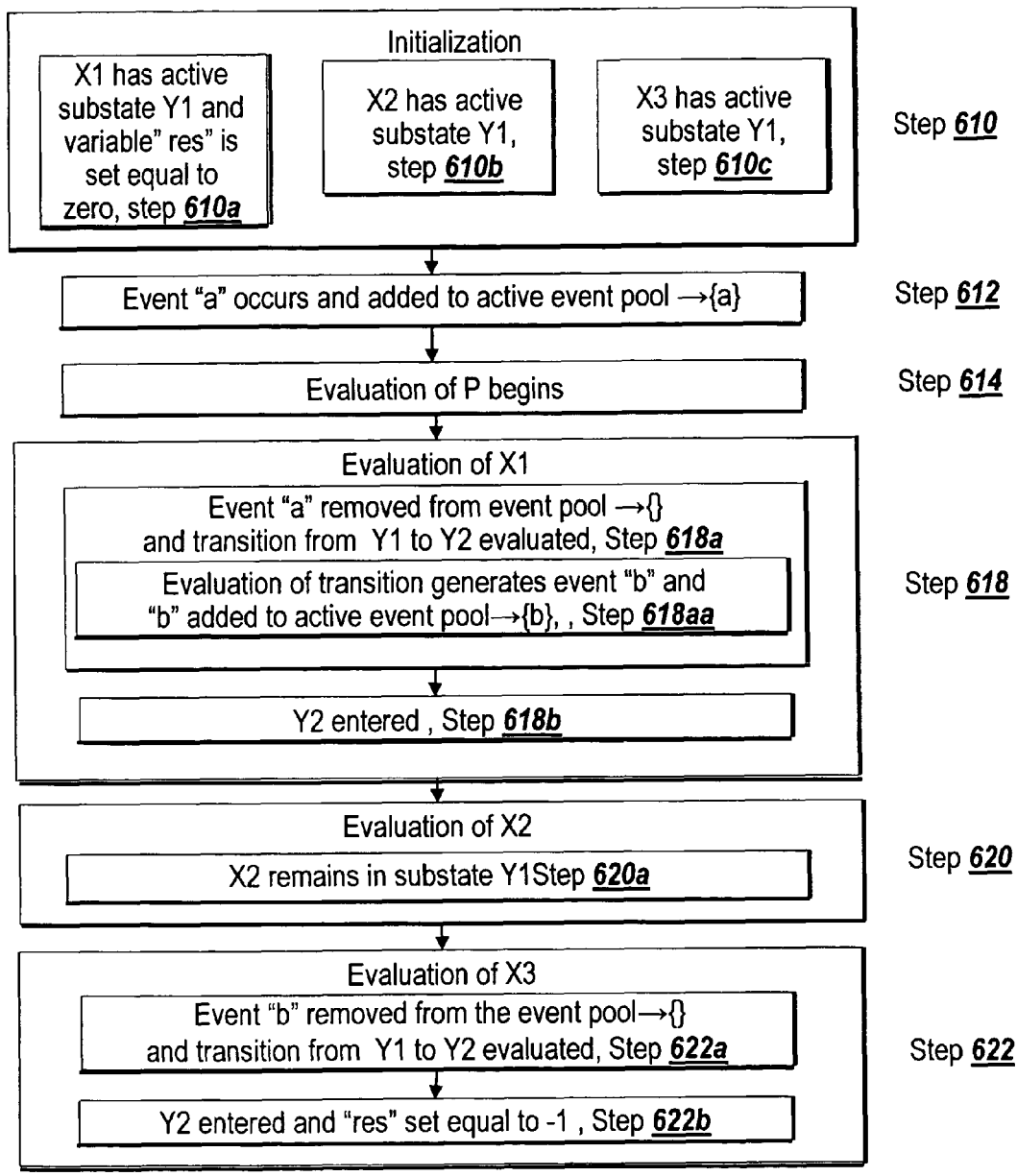
FIG. 6B illustrates an exemplary processing order for the chart shown in FIG. 6A.

FIG. 6B illustrates an exemplary processing order for the statechart of FIG. 6A according to aspects of an illustrative embodiment. Upon initialization, X1 has active substate Y1 and variable "res" is set equal to zero (step 610a), X2 has active substate Y1 (step 610b), and X3 has active substate Y1 (step 610c). When an event "a" occurs (which may be generated externally), this event is added to an active event pool {a} (step 612). The statechart is then evaluated (step 614) in the order determined: X1, X2, X3.

When state X1 is evaluated (step 618), the state can react to the event "a" in the event pool {a} by transitioning from Y1 to Y2. Event "a" is taken out of the event pool leaving it empty { }, and the transition from Y1 to Y2 is evaluated (step 618a). The evaluation of the transition generates an event "b" which is put in the event pool {b} (step 618aa). Substate Y2 of X1 is entered (step 618b) and the evaluation of X1 completes.

When state X2 is evaluated (step 620), there are no events in the event pool to which it can react. Neither the condition res>0 nor the condition res<0 is true so X2 remains in substate Y1 (step 620a).

When state X3 is evaluated (step 622), the state can react to the event "b" in the event pool {b} by transitioning from Y1 to Y2. Event "b" is taken out of the event pool leaving it empty { } and the transition is taken (step 622a). Substate Y2 is entered and the variable "res" is set to the value negative one (step 622b). The evaluation of X3 completes and the evaluation of P is competed. After processing, X1 is in substate Y2, X2 is in substate Y1, X3 is in substate Y2 and the variable "res" is equal to 0.

Figure 6C:
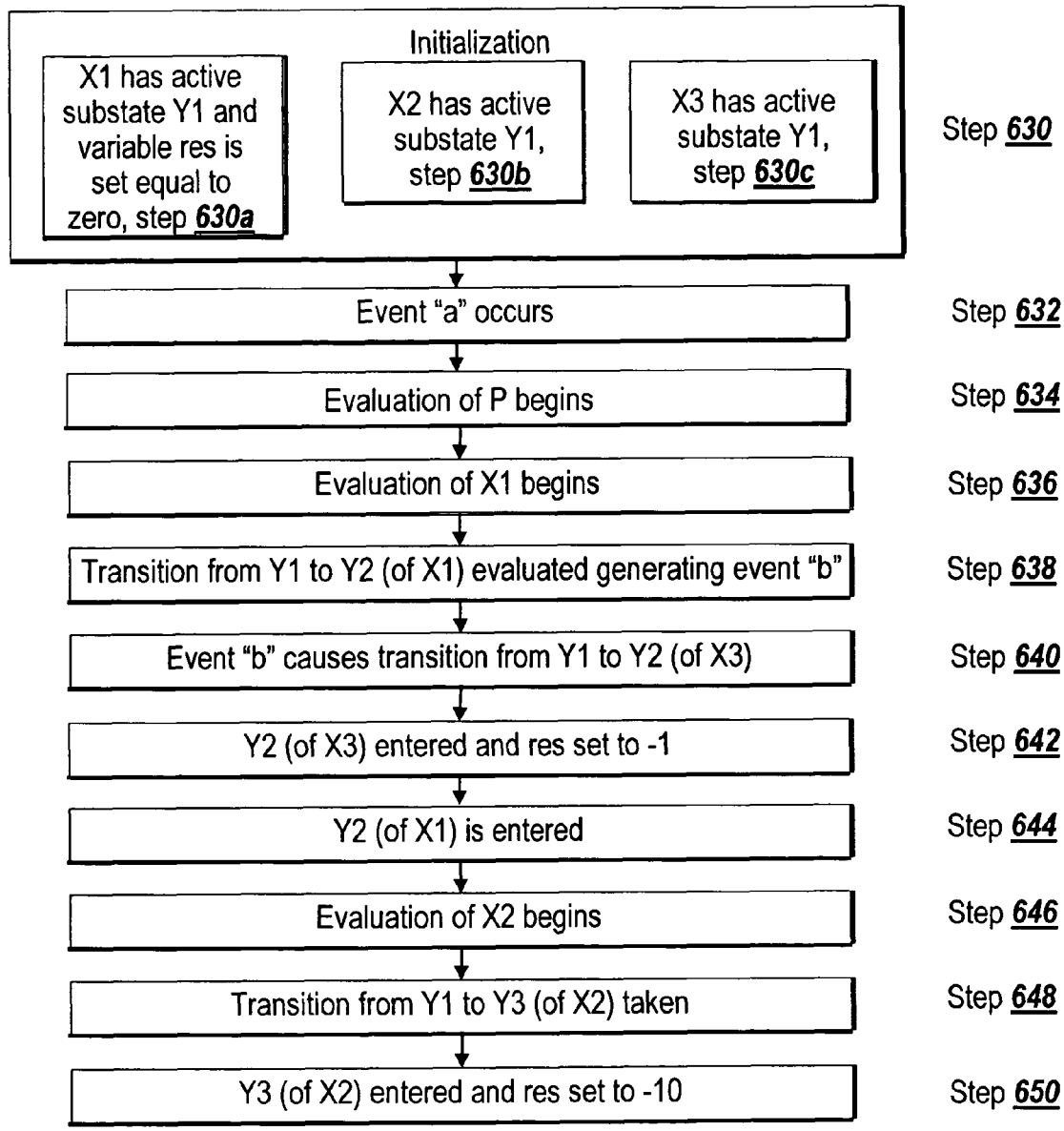
FIG. 6C illustrates an exemplary conventional processing order for the chart shown in FIG. 6A.

This is in contrast to the order of processing for a conventional state chart. FIG. 6C illustrates an exemplary conventional processing order for the statechart of FIG. 6A. Upon initialization, X1 has active substate Y1 and variable "res" is set equal to zero (step 630a), X2 has active substate Y1 (step 630b), and X3 has active substate Y1 (step 630c). An event "a" occurs (step 632) (which may be generated externally) and the evaluation of statechart P begins (step 634). Evaluation starts with the evaluation of X1 (step 636). The event "a" enabled the transition from Y1 to Y2. The transition is evaluated generating the event "b" (step 638). Event "b" causes the transition from Y1 to Y2 within X3 (step 640). Upon entering Y2 the variable "res" is set equal to negative one (step 642). The evaluation returns to X1 and Y2 is entered (step 644). This completes the evaluation of X1. The evaluation of X2 begins (step 646). The transition from Y1 to Y3 is taken (step 648). Y3 is entered and the variable "res" is set equal to negative ten (step 650). The evaluation X1 completes and the evaluation of P is then completed. After processing X1 is in substate Y2, X2 is in substate Y3, X3 is in substate Y2 and the variable "res" is equal to −10. These two different methods of evaluation result in a different set of final states and a different final value for the variable "res".

Although the exemplary processing order shown in FIG. 6B did not limit the scope of events, an event may be limited in scope ("scoped") by scoping the event in the event pool, for example by using the 'dot operator', {X3.b} or by having event pools for each scope. One of ordinary skill in the art will appreciate that there are many different methods of scoping an event in accordance with aspects of the illustrative embodiment.

FIG. 7 illustrates exemplary processing related to evaluating a state diagram according to a predetermined sequence. Initially, a representation of a state machine comprising three elements is operated on (step 710). A static list is generated for the three elements. The list represents a sequence in which the three elements are to be evaluated (step 715). A first one of the three elements is evaluated to generate an event that interacts only with a third one of the three elements (step 720). The event may also interact with other elements of the state machine that are not among the three elements. A second one of the three elements is evaluated prior to evaluating the third one of the three elements with respect to the event to generate a behavior related to one or more of the three elements (step 725). Evaluating an element with respect to an event may be interpreted as evaluating an element given that a particular event has occurred. Generating a behavior may include generating an output trace of the evaluation of the chart. It may include determining a sequence of at least some of the transitions of the state machine. It may include recording the new or the final internal states and/or changes in the values of the variables of the state machine.

FIG. 8 illustrates exemplary processing related to evaluating a state diagram according to a predetermined sequence which may use a list of active events. Initially, a representation of a state machine is operated on (step 805). A static list of the elements of the representation is generated, wherein the list represents a predetermined sequence in which certain elements are to be evaluated (step 810). The elements of the representation are evaluated in the order of the static list (step 815). According to aspects of the illustrative embodiment, that evaluation may include marking an event as active in a list of active events when the event is generated (step 820) and querying the list of active events to determine if any if the active events result in a response or reaction during the evaluation of an element (step 825).

Exemplary implementations described herein may eliminate the problems associated with parallel states being processed multiple times as a result of the blocking broadcasts of the prior art. These exemplary embodiments provide for more efficient implementation of state-diagrams in hardware, as an event stack would not be needed to manage suspended processes. These exemplary implementations can eliminate infinite loops created by recursive broadcasts between parallel states. These infinite loops would require infinitely growing event stacks to be realized in hardware.

What is claimed is:

1. In a computing device providing an environment for state diagramming, a method comprising:
    obtaining a state diagram via the environment using the computing device, the state diagram comprising:
        a plurality of states, each state representing the mode of an object at an instant in time, and
        one or more transitions, each transition representing a change from one state to another and being triggered by an event;
    processing a first event for the state diagram by evaluating the first event or one of the plurality of states;
    triggering a second event, wherein the triggering is based on the first event;
    determining whether to broadcast the second event, the determining comprising:
        obtaining a delay time value for processing the second event, and
        initiating processing of the second event based on the delay time value; and
    broadcasting the second event, the broadcasting:
        sending the second event to one or more states that are not connected to an originator of the broadcast by a transition,
        occurring using a command that identifies an event to be sent and a destination state,
        awakening the destination state if the destination state is active, and
        occurring in a non-blocking fashion that allows the first event to continue processing.

2. The method of claim 1, further comprising:
    processing the second event asynchronously with the first event after the second event is broadcast.

3. The method of claim 1, further comprising:
    initiating processing of the second event after the processing of the first event has completed.

4. The method of claim 1, further comprising:
    generating code from the state diagram.

5. The method of claim 4, wherein the code is generated in C, C++, Java, Javascript, or a hardware description language (HDL).

6. The method of claim 1, wherein the broadcasting further comprises:
    displaying a graphical representation that indicates that the broadcasting is of a non-blocking type.

7. The method of claim 1, wherein the delay time value is specified in one or more selected from the group comprising: real time units, a number of chart wakeups, a determined number of clock cycles, relative time units, and time units.

8. A non-transitory computer readable storage medium for use with a computing device holding instructions executable by the computing device for performing a method, the method comprising the steps of:
    obtaining a state diagram via the environment, the state diagram comprising:
        a plurality of states, each state representing the mode of an object at an instant in time, and
        one or more transitions, each transition representing a change from one state to another and being triggered by an event;
    processing a first event for the state diagram by evaluating the first event or one of the plurality of states;
    triggering a second event, wherein the triggering is based on the first event;
    determining whether to broadcast the second event, the determining comprising:
        obtaining a delay time value for processing the second event, and
        initiating processing of the second event based on the delay time value; and
    broadcasting the second event, the broadcasting:
        sending the second event to one or more states that are not connected to an originator of the broadcast by a transition,
        occurring using a command that identifies an event to be sent and a destination state,
        awakening the destination state if the destination state is active, and
        occurring in a non-blocking fashion that allows the first event to continue processing.

9. The medium of claim 8, wherein the method further comprises:
    processing the second event asynchronously with the first event after the second event is broadcast.

10. The medium of claim 8, wherein the method further comprises:
    initiating processing of the second event after the processing of the first event has completed.

11. The medium of claim 8, wherein the method further comprises:
    generating code from the state diagram.

12. The medium of claim 11, wherein the code is generated in C, C++, Java, Javascript, or a hardware description language (HDL).

13. The medium of claim 8, wherein the determining further comprises:
  displaying a graphical representation that indicates that the broadcasting is of a non-blocking type.

14. The medium of claim 8, wherein the delay time value is specified in one or more selected from the group comprising: real time units, a number of chart wakeups, a determined number of clock cycles, relative time units, and time units.

15. A system for generating and displaying a state diagram, the system comprising:
  a processor to:
  generate a state diagram environment, the state diagram present in the state diagram environment and comprising:
    a plurality of states, each state representing the mode of an object at an instant in time, and
    one or more transitions, each transition representing a change from one state to another and being triggered by an event;
  process a first event running in the environment by evaluating the first event or one of the plurality of states;
  determine whether to broadcast the second event, the determining comprising:
    obtaining a delay time value for processing the second event, and
    initiating processing of the second event based on the delay time value; and
  triggering a second event, the second event triggered by the first event,
    sending the second event to one or more states that are not connected to an originator of the broadcast by a transition,
    occurring using a command that identifies an event to be sent and a destination state,
    awakening the destination state if the destination state is active, and
    occurring in a non-blocking fashion that allows the first event to continue processing.

16. The system of claim 15, wherein the processor comprises logic to:
  process the second event asynchronously with respect to the first event.

17. The system of claim 15, wherein the processor comprises logic to:
  initiate processing of the second event after the processing of the first event has completed.

18. The system of claim 15, wherein the processor comprises logic to:
  generate code associated with the state diagram environment.

19. The system of claim 18, wherein generated code is C, C++, Java, Javascript, or a hardware description language (HDL).

20. The system of claim 15, wherein the processor comprises logic to:
  display a graphical representation that indicates that the broadcasting is of a non-blocking type.

21. The system of claim 15, wherein the delay time value is specified in one or more selected from the group comprising: real time units, a number of chart wakeups, a determined number of clock cycles, relative time units, and time units.

22. A method performed in a computing device, the method comprising:
  operating on a representation of a state machine, wherein the representation is a diagram that interacts with a graphical modeling environment, the state machine comprising:
    a plurality of states, each state representing the mode of an object at an instant in time, and
    one or more transitions, each transition representing a change from one state to another and being triggered by an event;
  generating, using the computing device, a static list of elements of the representation, each element being evaluated when the state machine is processed, at least one of the elements interacting with an event that results in a response or a reaction during an evaluation of the element, the list representing a predetermined sequence in which certain elements are to be evaluated; and
  evaluating, using the computing device, the elements of the representation in the order of the static list to generate a behavior related to one or more of the elements, wherein the evaluation of a particular element generates an event associated with another element that is not next in the predetermined sequence, wherein the evaluating comprises:
    adding an event to a group of active events when the event is generated; and
    querying the group of active events to determine if any of the active events result in a response or a reaction during the evaluation of an element.

23. The method of claim 22, wherein the graphical modeling environment is a state-diagramming environment and the diagram is a state diagram.

24. The method of claim 22, wherein the graphical modeling environment is a discrete event modeling environment and the diagram is an entity flow diagram.

25. A non-transitory computer readable storage medium for use with a computing device holding instructions executable by the computing device for performing a method, the method comprising:
  operating on a representation of a state machine, wherein the representation is a diagram that interacts with a graphical modeling environment, the state machine comprising:
    a plurality of states, each state representing the mode of an object at an instant in time, and
    one or more transitions, each transition representing a change from one state to another and being triggered by an event;
  generating a static list of elements of the representation, each element being evaluated when the state machine is processed, at least one of the elements interacting with an event that results in a response or a reaction during an evaluation of the element, the list representing a predetermined sequence in which certain elements are to be evaluated; and
  evaluating the elements of the representation according to the predetermined sequence to generate a behavior related to one or more of the elements, wherein the evaluation of one of the elements generates an event associated with another one of the elements that is not adjacent to the one of the elements in the predetermined sequence, wherein the evaluating comprises:
    adding an event to a group of active events when the event is generated; and
    querying the group of active events to determine if any of the active events result in a response or a reaction during the evaluation of an element.

26. The medium of claim 25, wherein the graphical modeling environment is a state-diagramming environment and the diagram is a state diagram.

27. The medium of claim 25, wherein the graphical modeling environment is a discrete event modeling environment and the diagram is an entity flow diagram.

28. A system for generating and displaying a graphical modeling environment, the system comprising:
   a processor to:
      operate on a representation of a state machine, wherein the representation is a diagram that interacts with a graphical modeling environment, the state machine comprising:
         a plurality of states, each state representing the mode of an object at an instant in time, and
         one or more transitions, each transition representing a change from one state to another and being triggered by an event;
      generate a static list of elements of the representation, the list representing a predetermined sequence in which certain elements are to be evaluated, each element being evaluated when the state machine is processed, at least one of the elements interacting with an event that results in a response or a reaction during an evaluation of the element; and
      evaluate the elements of the representation according to the predetermined sequence to generate a behavior related to one or more of the elements, wherein the evaluation of a particular element generates an event associated with another element that is not next to the particular element in the sequence, wherein the evaluating comprises:
         adding an event to a group of active events when the event is generated; and
         querying the group of active events to determine if any of the active events result in a response or a reaction during the evaluation of an element.

29. The system of claim 28, wherein the graphical modeling environment is a state-diagramming environment and the diagram is a state diagram.

30. The system of claim 28, wherein the graphical modeling environment is a discrete event modeling environment and the diagram is an entity flow diagram.

31. The system of claim 28, wherein the diagram is a network flow diagram.

* * * * *

UNITED STATES PATENT AND TRADEMARK OFFICE
CERTIFICATE OF CORRECTION

| | | |
|---|---|---|
| PATENT NO. | : 8,200,807 B2 | |
| APPLICATION NO. | : 11/513572 | |
| DATED | : June 12, 2012 | |
| INVENTOR(S) | : Vijay Raghavan et al. | |

It is certified that error appears in the above-identified patent and that said Letters Patent is hereby corrected as shown below:

In the Background of the Invention, column 1, line 30, please change "decendants" to -- descendants --.

In the Background of the Invention, column 1, line 46, please change "descendents" to -- descendants --.

In the Summary of the Invention, column 2, line 25, please change "generated" to -- generate --.

In the Detailed Description of the Invention, column 5, lines 61-62, please change "National Instruments, Inc," to -- National Instruments, Inc. --.

In the Detailed Description of the Invention, column 12, line 25, please change "descendents" to -- descendants --.

In the Detailed Description of the Invention, column 14, line 42, please change "processsed" to -- processed --.

In the Detailed Description of the Invention, column 14, line 57, please change "processsed" to -- processed --.

Signed and Sealed this
Sixth Day of November, 2012

David J. Kappos
*Director of the United States Patent and Trademark Office*